United States Patent
Tomioka et al.

(10) Patent No.: US 9,891,416 B2
(45) Date of Patent: Feb. 13, 2018

(54) VARIABLE MAGNIFICATION OPTICAL SYSTEM AND IMAGING APPARATUS

(71) Applicant: FUJIFILM Corporation, Tokyo (JP)

(72) Inventors: Ukyo Tomioka, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/215,883

(22) Filed: Jul. 21, 2016

(65) Prior Publication Data
US 2017/0031141 A1   Feb. 2, 2017

(30) Foreign Application Priority Data

Jul. 28, 2015   (JP) .................................. 2015-148416

(51) Int. Cl.
| | |
|---|---|
| G02B 15/16 | (2006.01) |
| G02B 15/20 | (2006.01) |
| G02B 15/28 | (2006.01) |
| G02B 15/173 | (2006.01) |
| G02B 15/24 | (2006.01) |
| G02B 13/00 | (2006.01) |

(52) U.S. Cl.
CPC ........... *G02B 15/20* (2013.01); *G02B 13/009* (2013.01); *G02B 15/16* (2013.01); *G02B 15/173* (2013.01); *G02B 15/24* (2013.01); *G02B 15/28* (2013.01)

(58) Field of Classification Search
CPC ........ G02B 15/00; G02B 15/14; G02B 15/15; G02B 15/16; G02B 15/20; G02B 15/22; G02B 15/24; G02B 15/28; G02B 13/009

USPC ................ 359/676–679, 683–687, 689–690, 359/694–706

See application file for complete search history.

(56) References Cited

U.S. PATENT DOCUMENTS

| | | | |
|---|---|---|---|
| 5,272,564 A | 12/1993 | Suzuki et al. | |
| 5,309,284 A | * 5/1994 | Nakatsuji | ............. G02B 15/173 359/687 |
| 5,828,490 A | 10/1998 | Sato | |

FOREIGN PATENT DOCUMENTS

| | | |
|---|---|---|
| JP | 04-191811 A | 7/1992 |
| JP | 09-325269 A | 12/1997 |

* cited by examiner

*Primary Examiner* — Darryl J Collins
(74) *Attorney, Agent, or Firm* — Studebaker & Brackett PC

(57) ABSTRACT

A variable magnification optical system includes, in order from the object side: a positive first lens group, which is fixed when changing magnification; a negative second lens group that moves from the object side to the image side when changing magnification from the wide angle end to the telephoto end; and a rearward lens group having a positive refractive power throughout the entire variable magnification range that includes at least one lens group that moves when changing magnification. The first lens group includes, in order from the object side, a positive first lens group front group, a positive first lens group middle group, and a first lens group rear group constituted by a negative lens. The first lens group front group and first lens group middle group include cemented lenses formed by cementing a negative lens and a positive lens, provided in this order from the object side, together.

18 Claims, 16 Drawing Sheets

FIG.9
EXAMPLE 1
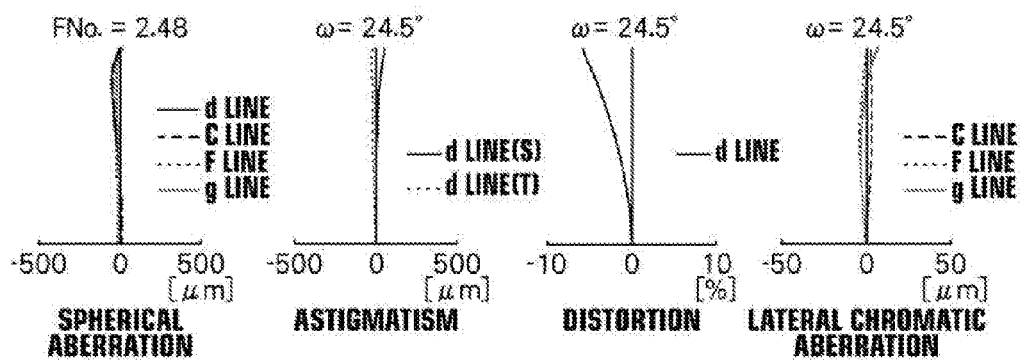
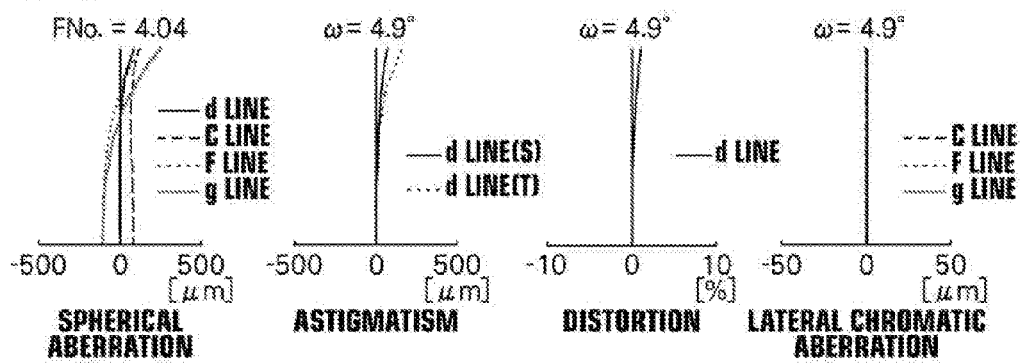
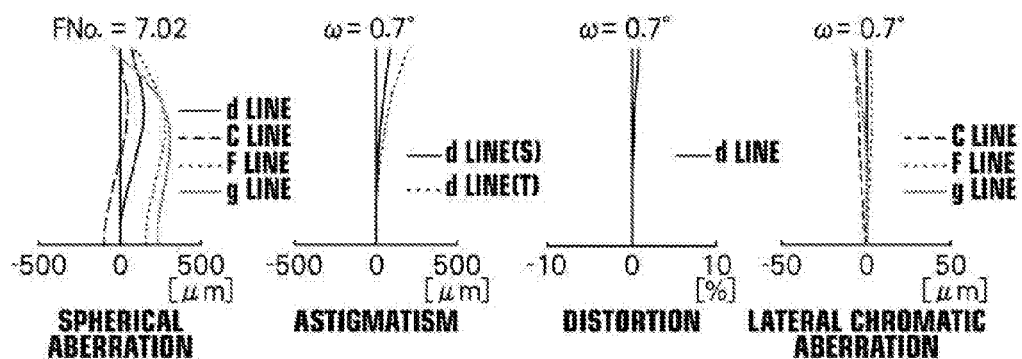

FIG.10
EXAMPLE 2
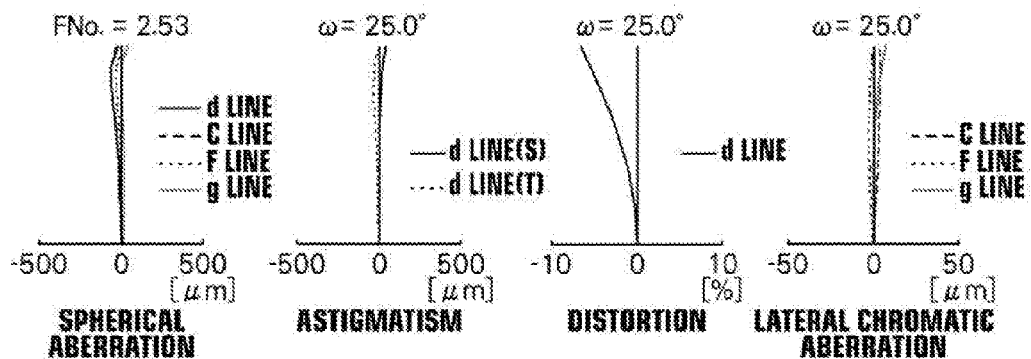
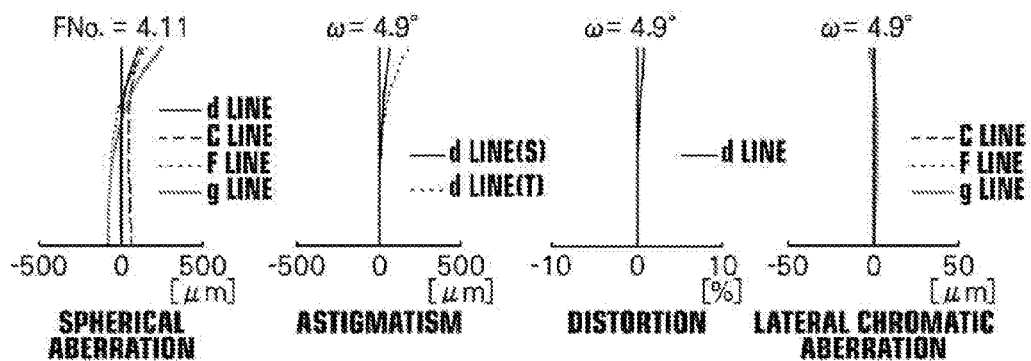
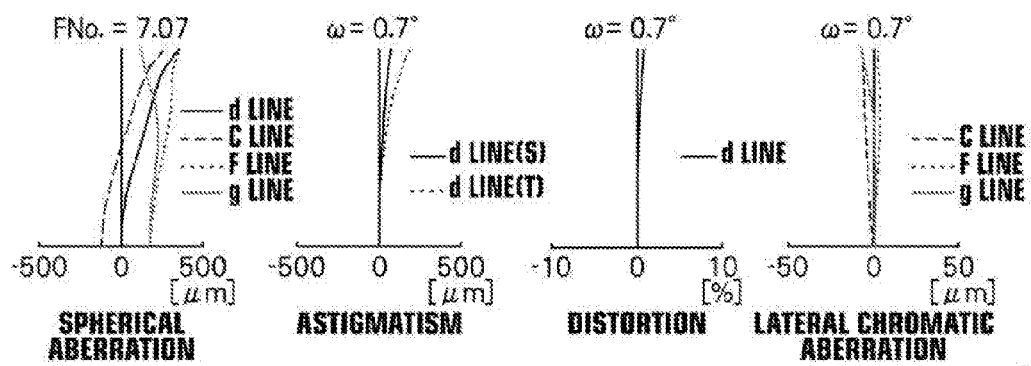

FIG.11
EXAMPLE 3
WIDE
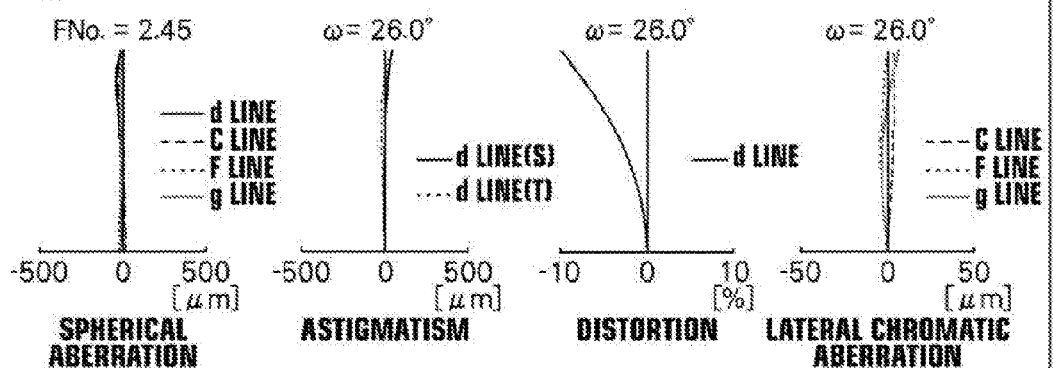
MIDDLE
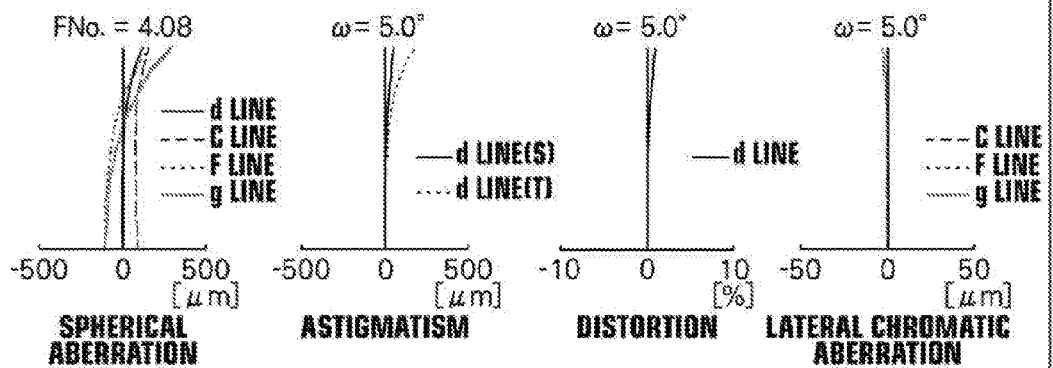
TELE
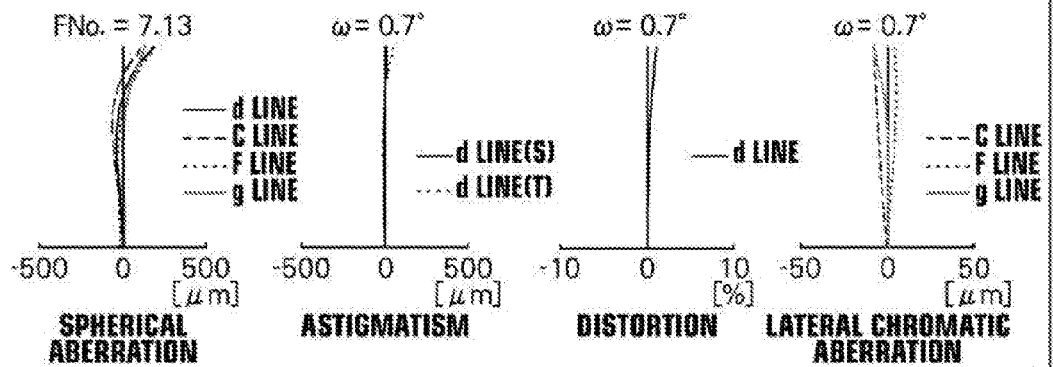

FIG.12 EXAMPLE 4
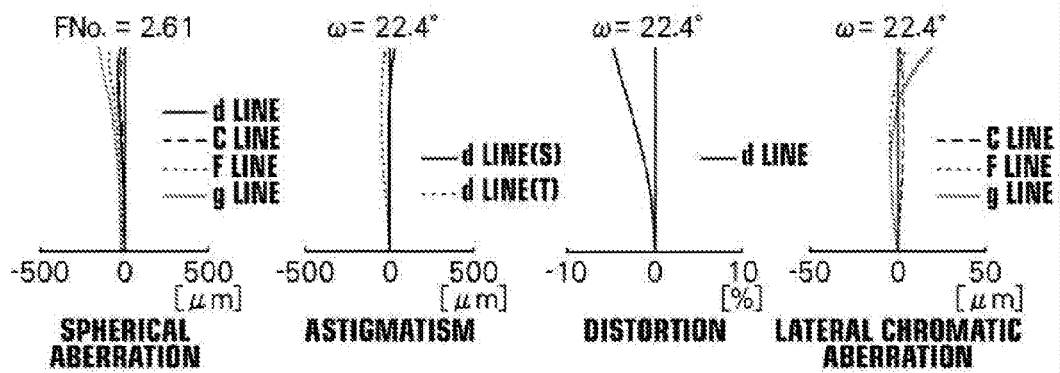
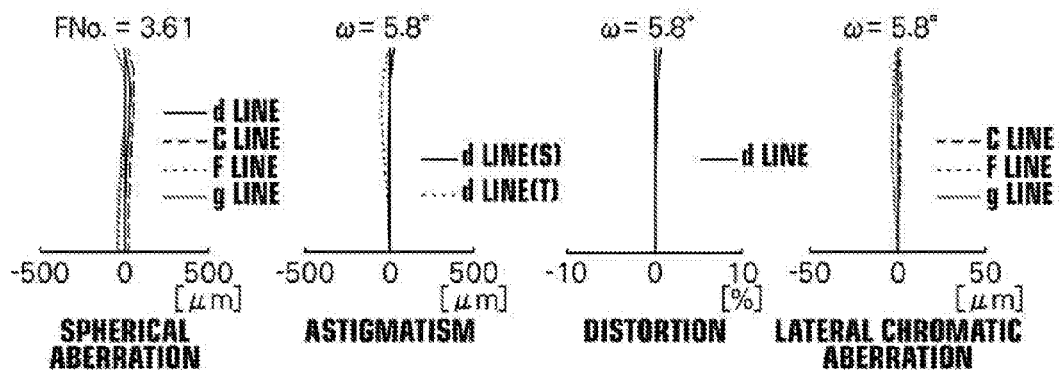
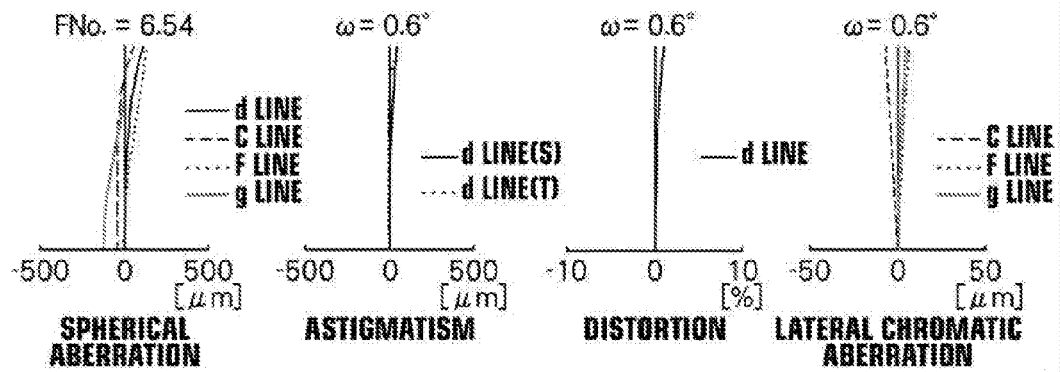

FIG.13
EXAMPLE 5
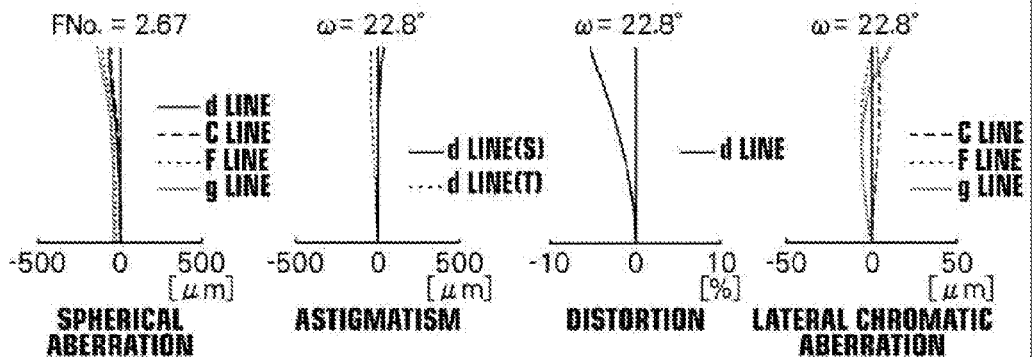
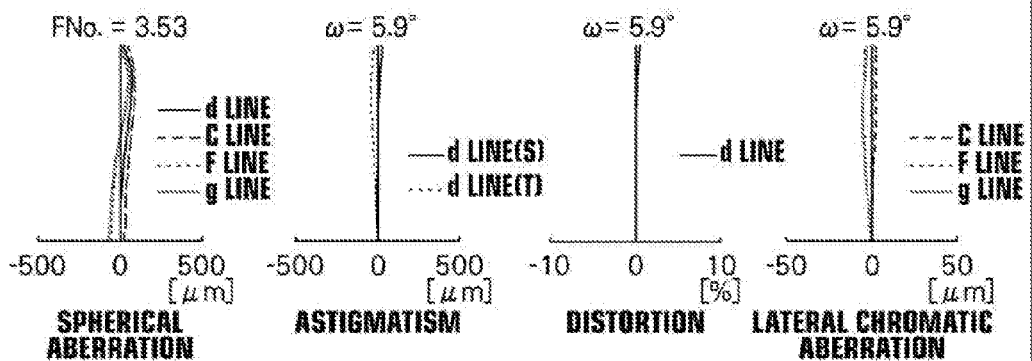
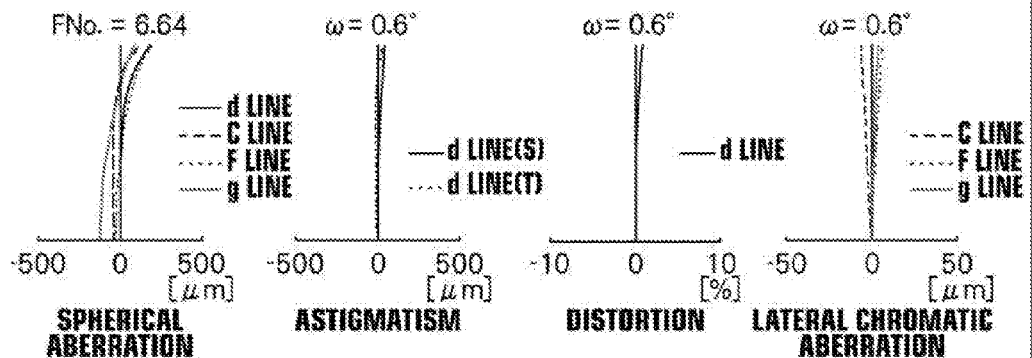

FIG.14
EXAMPLE 6
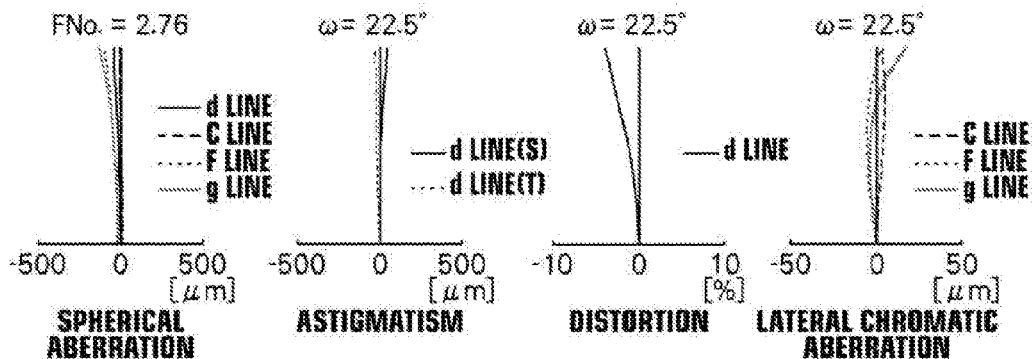
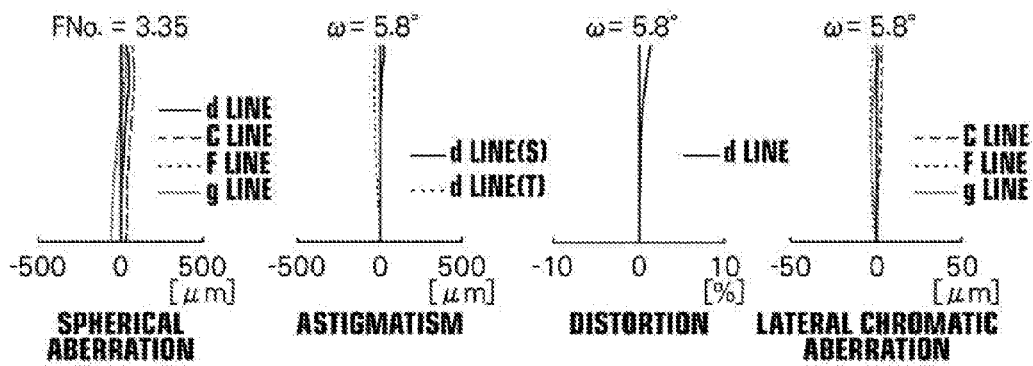
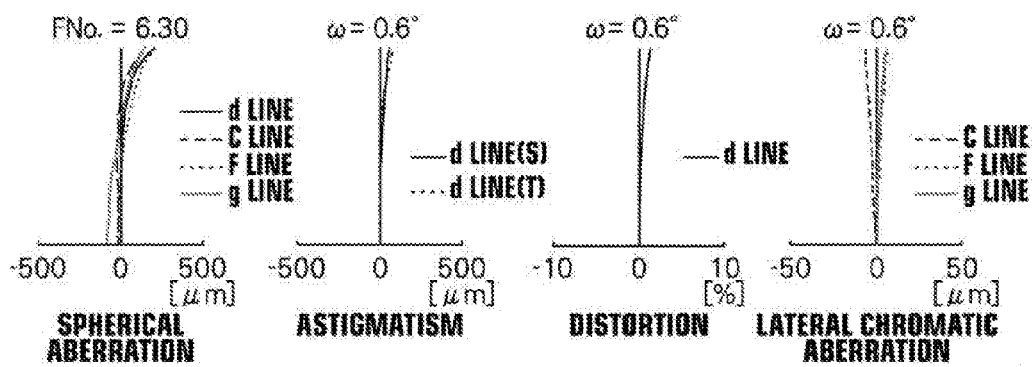

FIG.15 EXAMPLE 7
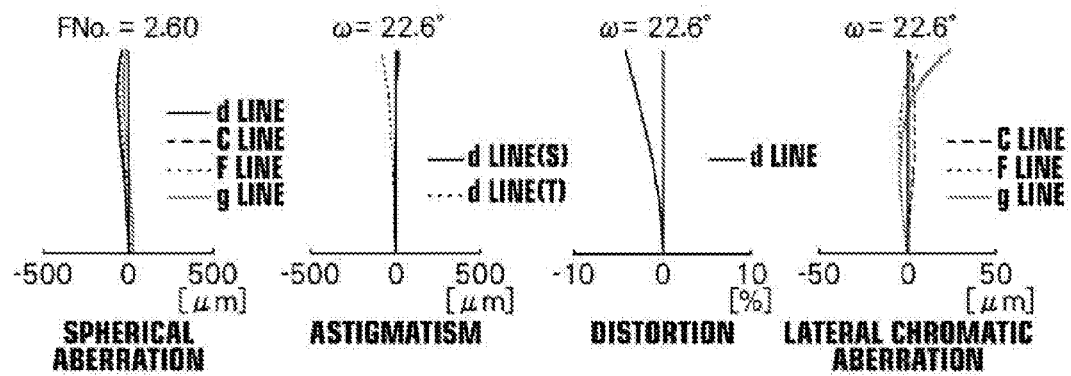
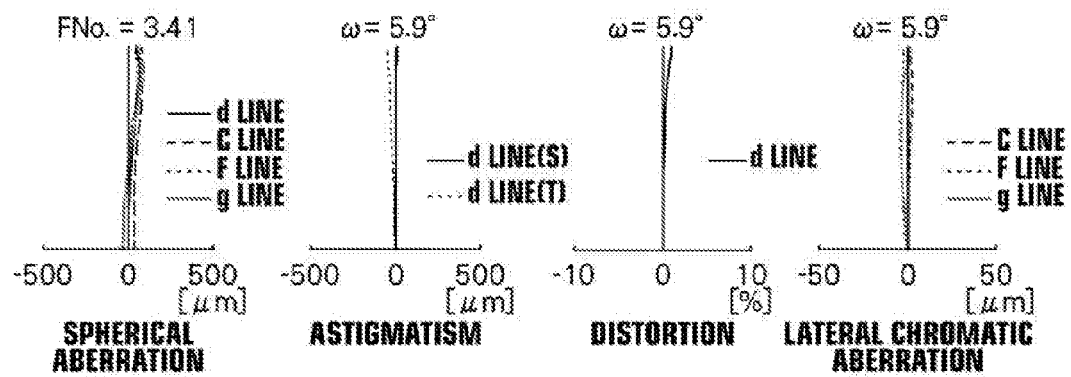
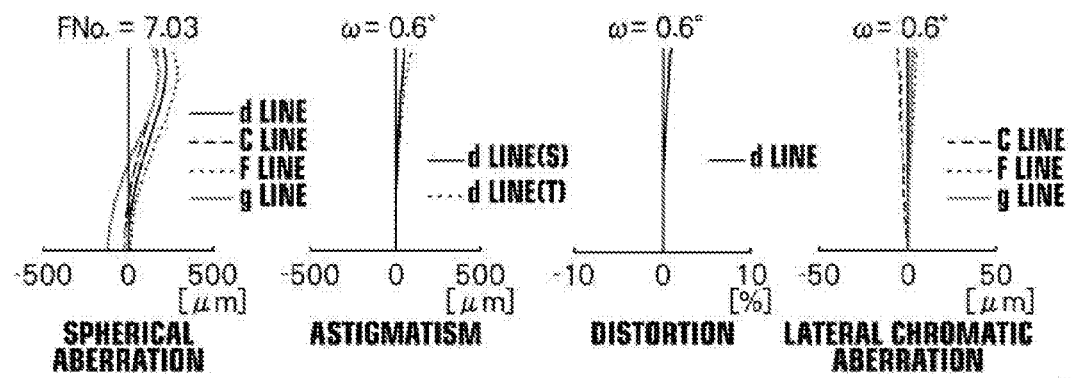

VARIABLE MAGNIFICATION OPTICAL SYSTEM AND IMAGING APPARATUS

CROSS REFERENCE TO RELATED APPLICATIONS

The present application claims priority under 35 U.S.C. §119 to Japanese Patent Application No. 2015-148416 filed on Jul. 28, 2015. The above application is hereby expressly incorporated by reference, in its entirety, into the present application.

BACKGROUND

The present disclosure is related to a variable magnification optical system and an imaging apparatus. More particularly, the present disclosure is related to a variable magnification optical system which is favorably suited for use in long distance surveillance cameras, and to an imaging apparatus equipped with the variable magnification optical system.

Conventionally, surveillance cameras are employed to prevent crime, to record scenes, etc., and the number thereof is increasing recently. Variable magnification optical systems are preferably utilized as lens systems for surveillance cameras in scenes that require high general use properties. Among such variable magnification optical systems, there is a trend for configurations in which the lens group provided most toward the object side does not move when changing magnification to be preferred. Known variable magnification optical systems in which the lens group provided most toward the object side are fixed when changing magnification are disclosed in Japanese Unexamined Patent Publication Nos. H9(1997)-325269 and H4(1992)-191811, for example.

SUMMARY

Long distance surveillance cameras had conventionally been employed at ports, airports, etc. Recently, there is growing demand for long distance surveillance cameras for various uses. For this reason, there is demand for a variable magnification optical system having a high variable magnification ratio which is utilizable in long distance surveillance cameras. However, it cannot be said that the variable magnification ratios of the optical systems disclosed in Japanese Unexamined Patent Publication Nos. H9(1997)-325269 and H4(1992)-191811 are sufficient. Assuming a case in which the high variable magnification ratios of the optical systems disclosed in Japanese Unexamined Patent Publication Nos. H9(1997)-325269 and H4(1992)-191811 are increased, it would become difficult to suppress fluctuations in longitudinal chromatic aberration and distortion when changing magnification.

The present disclosure has been developed in view of the foregoing circumstances. The present disclosure provides a variable magnification optical system having a high variable magnification ratio and high optical performance. The present disclosure also provides an imaging apparatus equipped with this variable magnification optical system.

A variable magnification optical system of the present disclosure consists of, in order from the object side to the image side:

a first lens group having a positive refractive power, which is fixed with respect to an image formation plane when changing magnification;

a second lens group having a negative refractive power that moves from the object side to the image side when changing magnification from the wide angle end to the telephoto end; and a rearward lens group having a positive refractive power throughout the entire variable magnification range that includes at least one lens group that moves when changing magnification, the distance between the rearward lens group and the second lens group changing when changing magnification;

the first lens group consisting of, in order from the object side to the image side, a first lens group front group having a positive refractive power, a first lens group middle group having a positive refractive power, and a first lens group rear group having a negative refractive power;

the first lens group front group consisting of a cemented lens formed by cementing a negative lens and a positive lens, provided in this order from the object side to the image side, together, the coupling surface of this cemented lens being convex toward the object side, and the surface most toward the object side within the first lens group front group being convex;

the first lens group middle group consisting of a cemented lens formed by cementing a negative lens and a positive lens, provided in this order from the object side to the image side, together, the coupling surface of this cemented lens being convex toward the object side, and the surface most toward the object side within the first lens group middle group being convex;

the first lens group rear group consisting of one negative lens; and

Conditional Formula (1) below being satisfied:

$$-50 < fT/f2 < -10 \quad (1)$$

wherein fT is the focal length of the entire optical system at the telephoto end, and f2 is the focal length of the second lens group.

In the variable magnification optical system of the present disclosure, it is preferable for Conditional Formula (1-1) below to be satisfied, and further for Conditional Formula (1-2) to be satisfied, within the range that satisfies Conditional Formula (1) above.

$$-40 < fT/f2 < -10 \quad (1\text{-}1)$$

$$-40 < fT/f2 < -15 \quad (1\text{-}2)$$

In the variable magnification optical system of the present disclosure, it is preferable for at least one of Conditional Formulae (2) through (4) and (2-1) through (4-1) to be satisfied.

$$2 < fT/f1 < 5 \quad (2)$$

$$-1.5 < f1/f1C < -0.3 \quad (3)$$

$$0 < (L1Cf + L1Cr)/(L1Cf - L1Cr) < 0.95 \quad (4)$$

$$2.5 < fT/f1 < 3.5 \quad (2\text{-}1)$$

$$-1 < f1/f1C < -0.5 \quad (3\text{-}1)$$

$$0.05 < (L1Cf + L1Cr)/(L1Cf - L1Cr) < 0.5 \quad (4\text{-}1)$$

wherein fT is the focal length of the entire optical system at the telephoto end, f1 is the focal length of the first lens group, f1C is the focal length of the first lens group rear group, L1Cf is the radius of curvature of the surface toward the object side of the negative lens of the first lens group rear group, and L1Cr is the radius of curvature of the surface toward the image side of the negative lens of the first lens group rear group.

In the variable magnification optical system of the present disclosure, it is preferable for Conditional Formulae (5) and (6) below to be satisfied. It is more preferable for at least one of Conditional Formulae (5-1) and (6-1) below to be satisfied, within the ranges that satisfy Conditional Formulae (5) and (6) below.

$$0 < \nu Ap - \nu An < 35 \quad (5)$$

$$60 < (\nu Ap + \nu An)/2 < 90 \quad (6)$$

$$5 < \nu Ap - \nu An < 30 \quad (5\text{-}1)$$

$$65 < (\nu Ap + \nu An)/2 < 80 \quad (6\text{-}1)$$

wherein νAp is the Abbe's number with respect to the d line of the positive lens within the first lens group front group, and νAn is the Abbe's number with respect to the d line of the negative lens within the first lens group front group.

In the variable magnification optical system of the present disclosure, the rearward lens group may consist of, in order from the object side to the image side, a third lens group having a positive refractive power which is fixed with respect to the image formation plane when changing magnification, a fourth lens group having a negative refractive power which moves when changing magnification, and a fifth lens group having a positive refractive power, the distance between the fourth lens group and the fifth lens group changing when changing magnification. In this case, it is preferable for a stop, which is fixed with respect to the image formation plane when changing magnification, to be provided. Also in this case, it is preferable for the fifth lens group to be fixed with respect to the image formation plane when changing magnification.

In the case that the rearward lens group consists of the third lens group through the fifth lens group described above, it is preferable for at least one of Conditional Formulae (7), (8), (7-1), and (8-1) below to be satisfied.

$$-1 < \beta 5T < 0 \quad (7)$$

$$1.15 < \beta 4T/\beta 4W < 3 \quad (8)$$

$$-0.6 < \beta 5T < -0.2 \quad (7\text{-}1)$$

$$1.2 < \beta 4T/\beta 4W < 2 \quad (8\text{-}1)$$

wherein β5T is the transverse magnification ratio of the fifth lens group in a state focused on an object at infinity at the telephoto end, β4T is the transverse magnification ratio of the fourth lens group in a state focused on an object at infinity at the telephoto end, β4W is the transverse magnification ratio of the fourth lens group in a state focused on an object at infinity at the wide angle end.

An imaging apparatus of the present disclosure is equipped with the variable magnification optical system of the present disclosure.

Note that the phrases "consists of" and "consisting of" refers to essential elements. Lenses that practically do not have any power, optical elements other than lenses such as a cover glass and filters, and mechanical components such as lens flanges, a lens barrel, an imaging element, a camera shake correcting mechanism, etc., may also be included in addition to the constituent elements listed above.

Note that the expression "lens group" does not necessarily refer to those constituted by a plurality of lenses, and include groups which are constituted by a single lens.

Note that the signs of the refractive powers of each lens group, referred to as "first lens group having a positive refractive power" and the like, are the signs of the refractive indices of each of the lens groups as a whole. In addition, the refractive powers of each lens group are those in a state in which the variable magnification optical system is focused on an object at infinity, unless particularly noted. In addition, the signs of transverse magnification ratios are defined as follows. That is, in a cross section in the horizontal direction that includes the optical axis, when the signs of object heights and image heights above the optical axis are designated as being positive and the signs of object heights and image heights below the optical axis are designated as being negative, the sign of the transverse magnification is positive in the case that the object height and the image height are the same sign, and negative when the in the case that the object height and the image height are different signs.

Note that the signs of the refractive powers of the lens groups, the refractive powers of the lenses, the surface shapes of the lenses, and the values of the radii of curvature in the variable magnification optical system of the present disclosure are considered in the paraxial region in cases that aspherical surfaces are included. In addition, the signs of the radii of curvature are positive for shapes which are convex toward the object side, and negative for shapes which are convex toward the image side.

In the present disclosure, the configuration of the first lens group is set in detail and a predetermined conditional formula related to the refractive power of the second lens group is satisfied in a lens system constituted by, in order from the object side to the image side, the fixed positive first lens group, the moving negative second lens group, and the rearward lens group that includes a moving group and is positive throughout the entire variable magnification range. Therefore, a variable magnification optical system having a high variable magnification ratio and high optical performance, as well as an imaging apparatus equipped with this variable magnification optical system, can be provided.

BRIEF DESCRIPTION OF THE DRAWINGS

FIG. 9 is a collection of diagrams that illustrate various aberrations of the variable magnification optical system according to Example 1, wherein the diagrams illustrate spherical aberration, astigmatism, distortion, and lateral chromatic aberration in order from the left side of the drawing sheet.

FIG. 10 is a collection of diagrams that illustrate various aberrations of the variable magnification optical system according to Example 2, wherein the diagrams illustrate spherical aberration, astigmatism, distortion, and lateral chromatic aberration in order from the left side of the drawing sheet.

FIG. 11 is a collection of diagrams that illustrate various aberrations of the variable magnification optical system according to Example 3, wherein the diagrams illustrate spherical aberration, astigmatism, distortion, and lateral chromatic aberration in order from the left side of the drawing sheet.

FIG. 12 is a collection of diagrams that illustrate various aberrations of the variable magnification optical system according to Example 4, wherein the diagrams illustrate spherical aberration, astigmatism, distortion, and lateral chromatic aberration in order from the left side of the drawing sheet.

FIG. 13 is a collection of diagrams that illustrate various aberrations of the variable magnification optical system according to Example 5, wherein the diagrams illustrate spherical aberration, astigmatism, distortion, and lateral chromatic aberration in order from the left side of the drawing sheet.

FIG. 14 is a collection of diagrams that illustrate various aberrations of the variable magnification optical system according to Example 6, wherein the diagrams illustrate spherical aberration, astigmatism, distortion, and lateral chromatic aberration in order from the left side of the drawing sheet.

FIG. 15 is a collection of diagrams that illustrate various aberrations of the variable magnification optical system according to Example 7, wherein the diagrams illustrate spherical aberration, astigmatism, distortion, and lateral chromatic aberration in order from the left side of the drawing sheet.

DETAILED DESCRIPTION OF THE PREFERRED EMBODIMENTS

Figure 1:
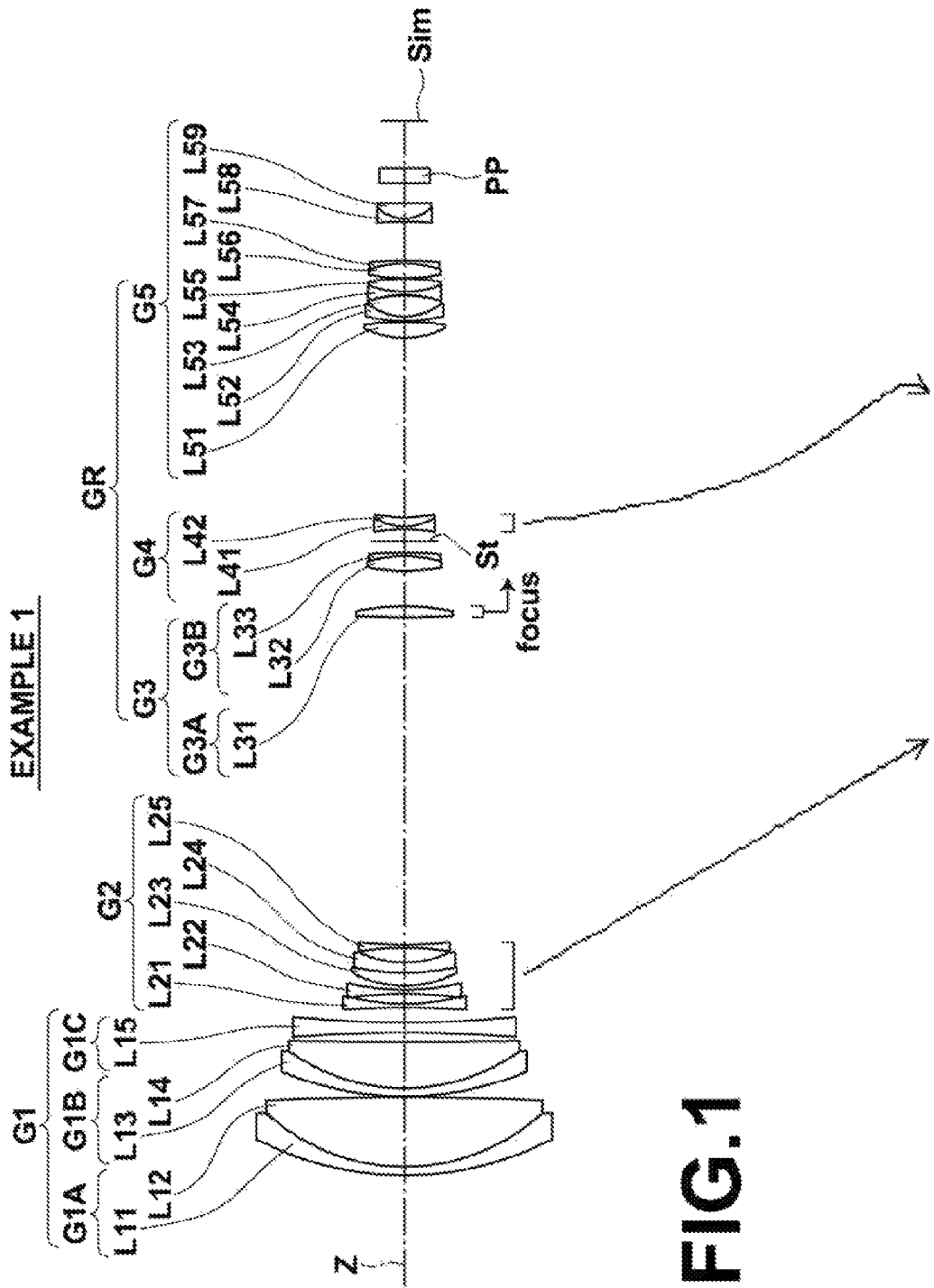
FIG. 1 is a sectional diagram that illustrates the configuration of a variable magnification optical system according to Example 1 of the present disclosure.

Hereinafter, embodiments of the present disclosure will be described in detail with reference to the attached drawings. FIG. 1 through FIG. 7 are cross sectional diagrams that illustrate the configurations of variable magnification optical systems according to embodiments, each of which corresponds to Examples 1 through 7 to be described later. In FIG. 1 through FIG. 7, the left side is the object side, and the right side is the image side. FIG. 1 through FIG. 7 illustrate lens configurations in a state focused on an object at infinity at the wide angle end. In addition, FIG. 8 illustrates the configurations of the example of FIG. 1 and light beams in each variable magnification state. In FIG. 8, a state at the wide angle end is illustrated in the upper portion denoted "WIDE", a state in which the variable magnification optical system is in an intermediate focal point distance is illustrated in the middle portion denoted "MIDDLE", and a state at the telephoto angle end is illustrated in the upper portion denoted "TELE". FIG. 8 illustrates an axial light beam 2w and an off axis light beam 3w at a maximum angle of view at the wide angle end, an axial light beam 2m and an off axis light beam 3m at a maximum angle of view in the state in which the variable magnification optical system is in an intermediate focal point distance, and an axial light beam 2t and an off axis light beam 3t at a maximum angle of view at the telephoto end. The basic configurations of the examples illustrated in FIG. 1 through FIG. 7 as well as the manners in which the drawings are illustrated are the same. Therefore, a description will mainly be given hereinbelow with reference to the example illustrated in FIG. 1.

This variable magnification optical system is constituted by, from the object side to the image side along an optical axis Z, a first lens group G1 having a positive refractive power, a second lens group G2 having a negative refractive power, and a rearward lens group GR that includes at least one lens group that moves when changing magnification and has a positive refractive power throughout the entire variable magnification range. When changing magnification from the wide angle end to the telephoto end, the first lens group G1 is fixed with respect to an image formation plane Sim, the second lens group G2 moves from the object side to the image side, and the distance between the rearward lens group GR and the second lens group G2 changes. By adopting this configuration, the second lens group G2 can bear the principal function of changing magnification. In addition, this configuration is advantageous from the viewpoint of increasing the magnification ratio.

FIG. 1 illustrates an example in which the rearward lens group GR is constituted by, in order from the object side to the image side, three lens groups, which are a third lens group G3, a fourth lens group G4, and a fifth lens group G5. In the example of FIG. 1, when changing magnification from the wide angle end to the telephoto end, the third lens group G3 and the fifth lens group G5 are fixed with respect to the image formation plane Sim, and the fourth lens group G4 moves from the object side to the image side, then moves from the image side to the object side thereafter. In FIG. 1, the trajectories of movement of the second lens group G2 and the fourth lens group G4 are schematically indicated by the arrows beneath these lens groups.

Note that the example illustrated in FIG. 1 is that in which an aperture stop St is provided between the third lens group G3 and the fourth lens group G4. However, it is possible for the aperture stop St to be provided at a position different from that of this example. Note that the aperture stop St illustrated in FIG. 1 does not necessarily represent the size or shape thereof, but indicates the position thereof along the optical axis Z. It is preferable for the aperture stop St to be fixed with respect to an image formation plane Sim when changing magnification. Adopting such a configuration is advantageous from the viewpoint of suppressing increases in the diameters of the lenses within the first lens group G1 at the wide angle end. It is preferable for the aperture stop St to be provided between the surface most toward the image side within the second lens group G2 and the surface most toward the object side within the lens group most toward the image side in the rearward lens group GR. Adopting such a configuration is more advantageous from the viewpoint of suppressing increases in the diameters of the lenses within the first lens group G1 at the wide angle end. In the case that the rearward lens group GR is constituted by three lens groups, which are, in order from the object side to the image side, the third lens group G3, the fourth lens group G4, and the fifth lens group G5, it is preferable for the aperture stop St to be positioned between the surface most toward the image side within the second lens group G2 and the surface most toward the object side within the fourth lens group G4, in order to achieve a configuration which is more advantageous from the viewpoint of suppressing increases in the diameters of the lenses within the first lens group G1 at the wide angle end.

In addition, FIG. 1 illustrates an example in which a plane parallel plate shaped optical member PP is provided between the lens system and the image formation plane Sim. The optical member PP presumes the presence of various filters such as an infrared cutoff filter and a low pass filter, a cover glass, etc. In the present disclosure, the optical member PP may be provided at a position different from that in the example of FIG. 1. In addition, a configuration from which the optical member PP is omitted is also possible.

The first lens group G1 is constituted by, in order from the object side to the image side: a first lens group front group G1A having a positive refractive power; a first lens group middle group G1B having a positive refractive power; and a first lens group rear group G1C having a negative refractive power. In the example illustrated in FIG. 1, the first lens group front group G1A is constituted by, in order from the object side to the image side, a lens L11 and a lens L12, the first lens group middle group G1B is constituted by, in order from the object side to the image side, a lens L13 and a lens L14, and the first lens group rear group G1C is constituted by a lens L15.

The first lens group front group G1A is constituted by a cemented lens formed by cementing a negative lens and a positive lens, provided in this order from the object side to the image side, together, which has a positive refractive power as a whole. The first lens group middle group G1B is constituted by a cemented lens formed by cementing a negative lens and a positive lens, provided in this order from the object side to the image side, together, which has a positive refractive power as a whole. Providing two cemented lenses having positive refractive powers consecutively from the most object side in this manner is advantageous from the viewpoints of reducing the amounts of spherical aberration and longitudinal chromatic aberration at the telephoto side.

The cemented lens of the first lens group front group G1A is configured such that the coupling surface thereof is convex toward the object side. Thereby, differences in spherical aberration curves depending on wavelengths and the generation of higher order spherical aberration can be suppressed. The cemented lens of the first lens group front group G1A is configured such that the surface most toward the object side within the first lens group front group G1A is convex. Adopting such a configuration is advantageous from the viewpoint of shortening the total length of the variable magnification optical system. The cemented lens of the first lens group middle group G1B is configured such that the coupling surface of the cemented lens of the first lens group middle group G1B is convex toward the object side. Thereby, differences in spherical aberration curves depending on wavelengths and the generation of higher order spherical aberration can be suppressed. The surface most toward the object side within the first lens group middle group G1B is configured to be convex. Adopting such a configuration is advantageous from the viewpoints of shortening the total length of the variable magnification optical system and reducing the amount of spherical aberration.

The first lens group rear group G1C consists of one negative lens. Adopting such a configuration is advantageous from the viewpoints of correcting spherical aberration at the telephoto end and correcting distortion at the wide angle end. As illustrated in FIG. 8, the axial light beam 2w at the negative lens most toward the image side within the first lens group G1 is narrow at the wide angle end. The height of marginal light rays thereof is not high, but the height of the marginal light ray of the axial light beam 2t at the negative lens is high at the telephoto end. By the first lens group G1 being of the configuration described above and providing a negative lens at the most image side of the first lens group G1, this negative lens can favorably correct spherical aberration at the telephoto end without influencing spherical aberration at the wide angle end to a great degree.

Further, this variable magnification optical system is configured such that Conditional Formula (1) below related to the second lens group G2, which bears the principal magnification changing function, is satisfied.

$$-50 < fT/f2 < -10 \quad (1)$$

wherein fT is the focal length of the entire optical system at the telephoto end, and f2 is the focal length of the second lens group.

By configuring the variable magnification optical system such that the value of fT/f2 is not less than or equal to the lower limit defined in Conditional Formula (1), fluctuations in various aberrations when changing magnification, particularly spherical aberration and distortion, can be suppressed. Configuring the variable magnification optical system such that the value of fT/f2 is not greater than or equal to the upper limit defined in Conditional Formula (1) is advantageous from the viewpoints of increasing the magnification ratio and shortening the total length of the variable magnification optical system.

It is preferable for Conditional Formula (1-1) below to be satisfied, in order to cause the advantageous effects related to the lower limit of Conditional Formula (1) to become more prominent, while obtaining the advantageous effects related to the upper limit of Conditional Formula (1).

$$-40 < fT/f2 < -10 \quad (1\text{-}1)$$

In addition, it is preferable for Conditional Formula (1-2) below to be satisfied, in order to cause the advantageous effects related to Conditional Formula (1) to become more prominent.

$$-40 < fT/f2 < -15 \quad (1\text{-}2)$$

In addition, it is preferable for Conditional Formula (2) below to be satisfied in this variable magnification optical system.

$$2 < fT/f1 < 5 \quad (2)$$

wherein fT is the focal length of the entire optical system at the telephoto end, and f1 is the focal length of the first lens group.

Configuring the variable magnification optical system such that the value of fT/f1 is not less than or equal to the lower limit defined in Conditional Formula (2) is advantageous from the viewpoint of shortening the total length of the variable magnification optical system. Configuring the variable magnification optical system such that the value of fT/f1 is not greater than or equal to the upper limit defined in Conditional Formula (2) is advantageous from the viewpoints of increasing the magnification ratio and reducing the amount of spherical aberration at the telephoto end. It is preferable for Conditional Formula (2-1) below to be satisfied, in order to cause the advantageous effects related to Conditional Formula (2) to become more prominent.

$$2.5 < fT/f1 < 3.5 \quad (2\text{-}1)$$

In addition, it is preferable for Conditional Formula (3) below to be satisfied in this variable magnification optical system.

$$-1.5 < f1/f1C < -0.3 \quad (3)$$

wherein f1 in the focal length of the first lens group, and f1C is the focal length of the first lens group rear group.

By setting the value of f1/f1C to be within the range defined in Conditional Formula (3), correcting spherical aberration to an appropriate range will be facilitated. It is more preferable for Conditional Formula (3-1) below to be satisfied, in order to cause the advantageous effect related to Conditional Formula (3) to become more prominent.

$$-1 < f1/f1C < -0.5 \quad (3\text{-}1)$$

In addition, it is preferable for Conditional Formula (4) below to be satisfied in this variable magnification optical system.

$$0 < (L1Cf + L1Cr)/(L1Cf - L1Cr) < 0.95 \quad (4)$$

wherein L1Cf is the radius of curvature of the surface toward the object side of the negative lens of the first lens group rear group, and L1Cr is the radius of curvature of the surface toward the image side of the negative lens of the first lens group rear group.

As described previously, the negative lens of the first lens group rear group G1C is important in correcting spherical aberration at the telephoto end. Conditional Formula (4) is a formula related to the shape of this negative lens. By maintaining the value of (L1Cf+L1Cr)/(L1Cf−L1Cr) to be within the range defined in Conditional Formula (4), spherical aberration at the telephoto end can be favorably corrected. It is more preferable for Conditional Formula (4-1) below to be satisfied, in order to cause the advantageous effect related to Conditional Formula (4) to become more prominent.

$$0.05 < (L1Cf + L1Cr)/(L1Cf - L1Cr) < 0.5 \quad (4\text{-}1)$$

In addition, it is preferable for Conditional Formulae (5) and (6) below related to the positive lens and the negative lens that constitute the cemented lens of the first lens group front group G1A to be satisfied.

$$0 < vAp - vAn < 35 \quad (5)$$

$$60 < (vAp + vAn)/2 < 90 \quad (6)$$

wherein vAp is the Abbe's number with respect to the d line of the positive lens within the first lens group front group, and vAn is the Abbe's number with respect to the d line of the negative lens within the first lens group front group.

By configuring the variable magnification optical system such that the value of vAp−vAn is not less than or equal to the lower limit defined in Conditional Formula (5), favorable correction of longitudinal chromatic aberration at the telephoto end will be facilitated. By configuring the variable magnification optical system such that the value of vAp−vAn is not greater than or equal to the upper limit defined in Conditional Formula (5), the generation of second order longitudinal chromatic aberration at the telephoto end can be suppressed. It is more preferable for Conditional Formula (5-1) below, in order to cause the advantageous effects related to Conditional Formula (5) to become more prominent.

$$5 < vAp - vAn < 30 \quad (5\text{-}1)$$

By configuring the variable magnification optical system such that the value of (vAp+vAn)/2 is not less than or equal to the lower limit defined in Conditional Formula (6), the generation of second order longitudinal chromatic aberration at the telephoto end can be suppressed. By selecting materials from among currently utilizable optical materials such that the value of (vAp+vAn)/2 is not greater than or equal to the upper limit defined in Conditional Formula (6), materials having a difference in refractive indices can be selected for the positive lens and the negative lens that constitute the cemented lens of the first lens group front group G1A, which is advantageous from the viewpoint of correcting spherical aberration. It is more preferable for Conditional Formula (6-1) below, in order to cause the advantageous effects related to Conditional Formula (6) to become more prominent.

$$65 < (vAp + vAn)/2 < 80 \quad (6\text{-}1)$$

Note that it is possible to arbitrarily set the number of lens groups that constitute the rearward lens group GR. Two lens groups may constitute the rearward lens group GR, or three lens groups may constitute the rearward lens group GR. For example, the rearward lens group GR may be constituted by, in order from the object side to the image side, a third lens group G3 having a positive refractive power which is fixed with respect to the image formation plane Sim when changing magnification, a fourth lens group G4 having a negative refractive power that moves when changing magnification, and a fifth lens group G5 having a positive refractive power, the distance between the fourth lens group G4 and the fifth lens group G5 changing when changing magnification.

In the case that the rearward lens group GR is constituted by the three lens groups described above, increases in the diameters of the lenses within the fourth lens group G4 and the fifth lens group G5 can be suppressed by the third lens group G3 having a positive refractive power. In addition, the third lens group G3 having a positive refractive power also exhibits the effect of decreasing spherical aberration. The amount of movement of the fourth lens group G4 can be suppressed by the fourth lens group G4 having a negative refractive power, which contributes to a shortening of the total length of the variable magnification optical system. In addition, fluctuations in an image formation position, which are caused by the second lens group G2 moving when changing magnification, can be corrected by the fourth lens group G4 moving when changing magnification. The incident angles of principal light rays at peripheral angles of view that enter the image formation plane Sim can be suppressed, by the fifth lens group G5 having a positive refractive power. Note that it is preferable for the fifth lens group G5 to be fixed with respect to the image formation plane Sim when changing magnification. In this case, preventing entry of dust into the interior of the optical system can be facilitated. In addition, by configuring the variable magnification optical system such that only the second lens group G2 and the fourth lens group G4 move when changing magnification, the mechanism of an imaging apparatus can be simplified compared to a case in which the second lens group G2, the fourth lens group G4, and the fifth lens group G5 move. Adopting this configuration contributes to an improvement in the reliability of the imaging apparatus.

In the case that the rearward lens group GR is constituted by the three lens groups described above, it is preferable for Conditional Formula (7) below to be satisfied.

$$-1 \beta 5T < 0 \quad (7)$$

wherein β5T is the transverse magnification ratio of the fifth lens group in a state focused on an object at infinity at the telephoto end.

That the transverse magnification ratio of the fifth lens group G5 is negative means that divergent light enters the fifth lens group G5 and exits as convergent light. By configuring the variable magnification optical system such that the value of β5T is not less than or equal to the lower limit defined in Conditional Formula (7), the refractive power of the fifth lens group G5 can be prevented from becoming excessively strong, and it will become possible to reduce the amount of spherical aberration. By configuring the variable magnification optical system such that the value of β5T is not greater than or equal to the upper limit defined in Conditional Formula (7), the amount of movement of the fourth lens group G4 when changing magnification can be suppressed, which contributes to a shortening of the total length of the variable magnification optical system. It is more preferable for Conditional Formula (7-1) below to be satisfied, in order to cause the advantageous effects related to Conditional Formula (7) to become more prominent.

$$-0.6 < \beta 5T < -0.2 \quad (7\text{-}1)$$

In addition, in the case that the rearward lens group GR is constituted by the three lens groups described above, it is preferable for Conditional Formula (8) below to be satisfied.

$$1.15 < \beta 4T/\beta 4W < 3 \quad (8)$$

wherein β4T is the transverse magnification ratio of the fourth lens group in a state focused on an object at infinity at the telephoto end, and β4W is the transverse magnification ratio of the fourth lens group in a state focused on an object at infinity at the wide angle end.

By configuring the variable magnification optical system such that the value of β4T/β4W is not less than or equal to the lower limit defined in Conditional Formula (8), the function of changing magnification can be favorably distributed between the second lens group G2 and the fourth lens group G4, which is advantageous from the viewpoint of increasing the magnification ratio of the variable magnification optical system. By configuring the variable magnification optical system such that the value of β4T/β4W is not greater than or equal to the upper limit defined in Conditional Formula (8), the amount of movement of the fourth lens group G4 when changing magnification can be suppressed, which contributes to a shortening of the total length of the variable magnification optical system. Note that in the case that Conditional Formula (8) is satisfied and the variable magnification optical system is configured such that the fourth lens group moves during focusing operations, the amount of movement of the fourth lens group G4 during focusing operations can be suppressed. It is more preferable for Conditional Formula (8-1) below to be satisfied, in order to cause the advantageous effects related to Conditional Formula (8) to become more prominent.

$$1.2 < \beta 4T/\beta 4W < 2 \quad (8\text{-}1)$$

In the case that the rearward lens group GR is constituted by the three lens groups described above, any of the third lens group G3, the fourth lens group G4, and the fifth lens group G5 may be employed as the lens group that moves during focusing operations (hereinafter, also referred to as "focusing group"). Further, only a portion of these lens groups may be the focusing group.

For example, only a portion of the third lens group G3 may be the focusing group. In this case, it is preferable for the third lens group G3 to be constituted by, in order from the object side to the image side: a third lens group front group G3A having a positive refractive power and a third lens group rear group G3B having a positive refractive power, for the variable magnification optical system to be configured such that only the third lens group front group G3A moves during focusing operations, and for the third lens group front group G3A to move from the object side to the image side when changing focus from that on an object at infinity to that to an object at a proximal distance. The example illustrated in FIG. 1 adopts this configuration, and an arrow that indicates the direction of movement of the third lens group front group G3A, which is the focusing group, when changing focus from that on an object at infinity to that to an object at a proximal distance is illustrated in FIG. 1 with the text "focus". In the case that such a configuration is adopted, a converging effect can be administered by the third lens group front group G3A onto divergent light that propagates from the second lens group G2 toward the third lens group G3, by the third lens group G3 being divided into two positive lens groups. As a result, light output from the third lens group front group G3A can approximate collimated light. In the case that the light output from the third lens group front group G3A is collimated light, focusing operations can be performed without changing the image forming relationship of the third lens group front group G3A, by moving the third lens group front group G3A along the optical axis for a distance corresponding to an amount of displacement of a pseudo image position of the divergent light caused by changes in an object distance. Accordingly, fluctuations in the angle of view during focusing operations can be decreased in the case that the light output from the third lens group front group G3A is collimated light or approximates collimated light.

Alternatively, the fourth lens group G4 may be the focusing group. In this case, it is preferable for the variable magnification optical system is configured such that the transverse magnification ratio of the fourth lens group G4 in a state focused on an object at infinity to be negative throughout the entire variable magnification range, for only the fourth lens group G4 to move during focusing operations, and for the fourth lens group G4 to move from the object side toward the image side when changing focus from that on an object at infinity to that on an object at a proximal distance. The fourth lens group G4 is a negative lens group. That the transverse magnification ratio of a negative lens group is negative means that convergent light that enters this negative lens group is output as divergent light. Therefore, the focusing group can be miniaturized in the case that the fourth lens group G4 is the focusing group.

As a further alternative, only a portion of the fifth lens group G5 may be the focusing group. In this case, it is preferable for the fifth lens group G5 to consist of, in order from the object side to the image side: a fifth lens group front group G5A having a positive refractive power, a fifth lens group middle group G5B having a positive refractive power, and a fifth lens group rear group G5C having a negative refractive power, and for the variable magnification optical system to be configured such that only the fifth lens group middle group G5B moves during focusing operations, and the fifth lens group middle group G5B moves from the image side to the object side when changing focus from that on an object at infinity to that to an object at a proximal distance. In the case that this configuration is adopted, light beams can be converged by the fifth lens group front group G5A. Therefore, the focusing group can be miniaturized.

Arbitrary combinations of the preferred configurations and the possible configurations described above, including the conditional formulae, are possible. It is preferable for the configurations to be selectively adopted as appropriate, according to specifications required of the variable magnification optical system. According to the present embodiment, it is possible to realize a variable magnification optical system having a high variable magnification ratio and high optical performance. Note that here, a "high variable magnification ratio" refers to a magnification ratio of 30× or greater.

Next, examples of numerical values of the variable magnification optical system of the present disclosure will be described.

Example 1

The lens configuration of the variable magnification optical system of Example 1 is illustrated in FIG. 1 and FIG. 8. The manner in which the variable magnification optical system is illustrated has been described above, and therefore, redundant descriptions will be omitted here. The variable magnification optical system of Example 1 has a group configuration constituted by, in order from the object side to the image side, the first lens group G1 having a positive refractive power, the second lens group G2 having a negative refractive power, the third lens group G3 having a positive refractive power, the aperture stop St, the fourth lens group G4 having a negative refractive power, and the fifth lens group G5 having a positive refractive power. Among these lens groups, the third lens group G3 through the fifth lens group G5 constitute the rearward lens group GR. The rearward lens group GR has a positive refractive power throughout the entire variable magnification range. When changing magnification from the wide angle end to the telephoto end, the first lens group G1, the third lens group G3, the aperture stop St, and the fifth lens group G5 are fixed with respect to the image formation plane Sim, while the second lens group G2 moves form the object side to the image side, and the fourth lens group G4 moves from the object side to the image side, then from the image side to the object side.

Only a portion of the third lens group G3 moves during focusing operations. In the variable magnification optical system of Example 1, the third lens group G3 is constituted by, in order from the object side to the image side, the third lens group front group G3A having a positive refractive power, and the third lens group rear group G3B having a positive refractive power. When changing focus from that on an object at infinity to that on an object at a proximal distance, the third lens group front group G3A moves from the object side to the image side, while the third lens group rear group G3B is fixed with respect to the image formation plane Sim.

The first lens group G1 is constituted by, in order from the object side to the image side, lenses L11 through L15, and the second lens group G2 is constituted by, in order from the object side to the image side, lenses L21 through L25. The third lens group front group G3A is constituted by a positive lens L31, and the third lens group rear group G3B is constituted by, in order from the object side to the image side, lenses L32 and L33. The fourth lens group G4 is constituted by, in order from the object side to the image side, lenses L41 and L42, and the fifth lens group G5 is constituted by, in order from the object side to the image side, lenses L51 through L59.

Basic lens data of Example 1 are shown in Table 1, and items and variable distances among surfaces of Example 1 are shown in Table 2. In Table 1, ith (i=1, 2, 3, ...) surface numbers that sequentially increase from the object side to the image side, with the surface toward the object side of the constituent element at the most object side designated as first, are shown in the column Si. The radii of curvature of ith surfaces are shown in the column Ri. The distances along the optical axis Z between an ith surface and an i+1st surface are shown in the column Di. The refractive indices with respect to the d line (wavelength: 587.6 nm) of jth (j=1, 2, 3, ...) constituent elements that sequentially increase from the object side to the image side, with the constituent element at the most object side designated as first, are shown in the column Ndj. The Abbe's numbers of jth constituent elements with respect to the d line are shown in the column vdj.

Here, the signs of the radii of curvature are positive for surface shapes which are convex toward the object side, and negative for surface shapes which are convex toward the image side. Table 1 also shows the aperture stop St and the optical member PP. In Table 1, a surface number and text reading "(St)" are shown in the row of the surface number of the surface corresponding to the aperture stop St. The value in the lowermost row of Di is the distance between the surface most toward the image side of the variable magnification optical system and the image formation plane Sim. In addition, in Table 1, variable distances are indicated by DD [ ]. The surface number toward the object side is shown in the brackets [ ], and written in the column Di. Note that the values shown in Table 1 are those in a state in which the variable magnification optical system is focused on an object at infinity.

The zoom ratio Zr, the focal length f of the entire variable magnification optical system, the F number F No., the full angle of view 2w, and the values of variable distances with the d line as a reference are shown in Table 2. The indication "(°)" in the row 2w means that the units are degrees. In Table 2, the above values for the wide angle end, an intermediate focal point distance state, and the telephoto end are respectively shown in the columns "Wide Angle", "Intermediate", and "Telephoto". The data of Table 1 and the values of the variable distances in Table 2 are those in a state in which the variable magnification optical system is focused on an object at infinity.

In the data of the tables, degrees are employed as units for angles, and mm are employed as units for lengths. However, optical systems may be enlarged proportionately or reduced proportionately and utilized. Therefore, other appropriate units may be employed. In addition, the numerical values shown in each of the tables below are those which are rounded off at a predetermined number of digits.

TABLE 1

Example 1

| Si | Ri | Di | Ndj | vdj |
|---|---|---|---|---|
| 1 | 83.64030 | 2.193 | 1.54341 | 64.11 |
| 2 | 53.14260 | 17.928 | 1.49700 | 81.54 |
| 3 | −784.39213 | 0.243 | | |
| 4 | 83.21753 | 2.024 | 1.83827 | 42.96 |
| 5 | 51.29111 | 12.031 | 1.49700 | 81.54 |
| 6 | 3247.30104 | 2.340 | | |
| 7 | −360.86227 | 2.601 | 1.58913 | 61.13 |
| 8 | 276.94512 | DD [8] | | |
| 9 | −245.08935 | 1.000 | 1.70970 | 56.02 |
| 10 | 54.43469 | 2.615 | | |
| 11 | −108.08718 | 1.000 | 1.71299 | 53.87 |
| 12 | 62.57532 | 1.056 | | |
| 13 | 28.43116 | 3.389 | 1.95001 | 17.50 |

TABLE 1-continued

Example 1

| Si | Ri | Di | Ndj | vdj |
|---|---|---|---|---|
| 14 | 63.39468 | 2.599 | 1.79507 | 48.49 |
| 15 | 27.10153 | 3.759 | | |
| 16 | −74.55103 | 0.800 | 1.74035 | 53.96 |
| 17 | 96.67023 | DD [17] | | |
| 18 | 289.49075 | 2.818 | 1.78003 | 50.00 |
| 19 | −62.24178 | 9.153 | | |
| 20 | 56.50669 | 3.831 | 1.72888 | 55.06 |
| 21 | −32.96701 | 0.823 | 1.89959 | 23.21 |
| 22 | −104.74184 | 3.000 | | |
| 23 (St) | ∞ | DD [23] | | |
| 24 | −44.75934 | 0.810 | 1.88500 | 39.50 |
| 25 | 14.74807 | 2.350 | 2.00001 | 26.03 |
| 26 | 42.94455 | DD [26] | | |
| 27 | 23.75891 | 4.056 | 1.49700 | 81.54 |
| 28 | −85.90010 | 0.263 | | |
| 29 | 40.89615 | 1.200 | 1.79905 | 47.58 |
| 30 | 15.85152 | 5.348 | 1.52737 | 75.11 |
| 31 | −34.02029 | 0.166 | | |
| 32 | −29.26989 | 0.800 | 1.80000 | 48.00 |
| 33 | 27.30973 | 3.410 | 1.58644 | 66.70 |
| 34 | −58.65900 | 0.100 | | |
| 35 | 46.43391 | 3.770 | 1.62474 | 58.25 |
| 36 | −28.14008 | 0.800 | 1.80001 | 48.00 |
| 37 | −93.70162 | 10.000 | | |
| 38 | −75.95737 | 0.800 | 1.79998 | 48.00 |
| 39 | 9.89884 | 3.996 | 1.72738 | 28.63 |
| 40 | 2785.29076 | 5.000 | | |
| 41 | ∞ | 4.000 | 1.51633 | 64.14 |
| 42 | ∞ | 12.176 | | |

TABLE 2

Example 1

| | Wide Angle | Intermediate | Telephoto |
|---|---|---|---|
| Zr | 1.0 | 5.0 | 36.3 |
| F | 13.434 | 67.129 | 486.399 |
| F No. | 2.48 | 4.04 | 7.02 |
| 2ω (°) | 49.0 | 9.8 | 1.4 |
| DD [8] | 3.757 | 51.827 | 85.224 |
| DD [17] | 84.430 | 36.360 | 2.963 |
| DD [23] | 3.000 | 20.702 | 47.624 |
| DD [26] | 46.277 | 28.575 | 1.653 |

FIG. 9 is a collection of aberration diagrams of the variable magnification optical system of Example 1 in a state focused on an object at infinity. The aberration diagrams of FIG. 9 illustrate spherical aberration, the astigmatic aberration, the distortion, and the lateral chromatic aberration (chromatic aberration of magnification) in order from the left side of the drawing sheet. Aberrations at the wide angle end are illustrated in the upper portion of FIG. 9 labeled WIDE, aberrations at the intermediate focal point distance state are illustrated in the middle portion of FIG. 9 labeled MIDDLE, and aberrations at the telephoto end are illustrated in the lower portion of FIG. 9 labeled TELE. In the diagrams that illustrate spherical aberration, aberrations related to the d line (wavelength: 587.6 nm), the C line (wavelength: 656.3 nm), the F line (wavelength: 486.1 nm), and the g line (wavelength: 435.8 nm) are indicated by a black solid line, a long broken line, a short broken line, and a gray solid line, respectively. In the diagrams that illustrate astigmatism, aberrations related to the d line in the sagittal direction and the tangential direction are indicated by a solid line and a short broken line, respectively. In the diagrams that illustrate distortion, aberrations related to the d line are indicated by solid lines. In the diagrams that illustrate lateral chromatic aberration, aberrations related to the C line, the F line, and the g line are indicated by a long broken line, a short broken line, and a gray solid line, respectively. In the diagrams that illustrate spherical aberration, "FNo." denotes F numbers, and in the diagrams that illustrate other aberrations, "w" denotes half angles of view.

The symbols, the meanings, and the manner in which the data are shown in the description of Example 1 above are the same for the following Examples to be described later, unless particularly noted. Therefore, redundant descriptions thereof will be omitted below.

Example 2

Figure 2:
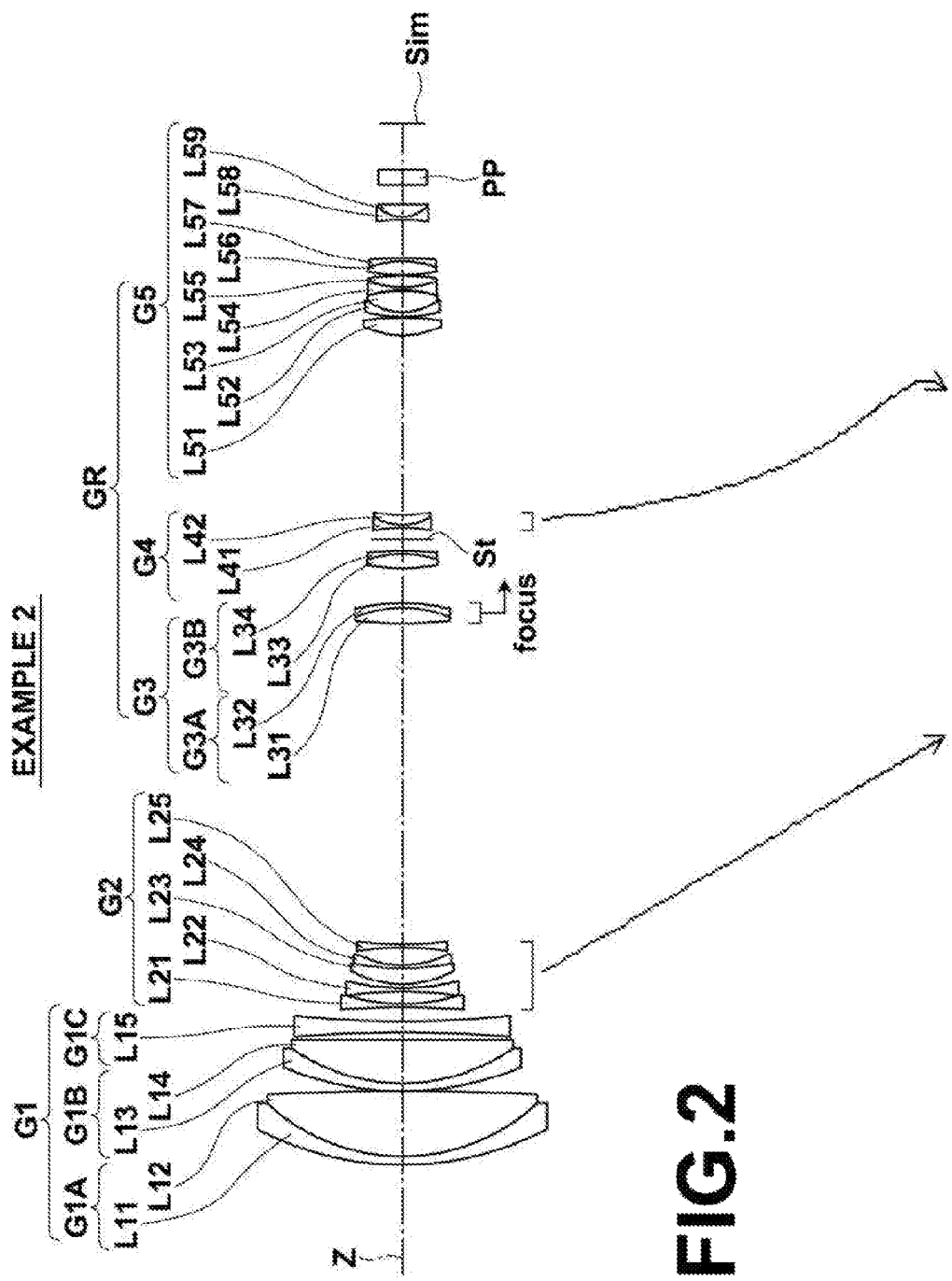
FIG. 2 is a sectional diagram that illustrates the configuration of a variable magnification optical system according to Example 2 of the present disclosure.

The lens configuration of the variable magnification optical system according to Example 2 is illustrated in FIG. 2. The configuration of lens groups, the lens groups that move when changing magnification, and the directions of movement thereof in the variable magnification optical system of Example 2 are the same as those of the variable magnification optical system of Example 1.

Only a portion of a third lens group G3 moves during focusing operations. In the variable magnification optical system of Example 2, the third lens group G3 is constituted by, in order from the object side to the image side, a third lens group front group G3A having a positive refractive power, and a third lens group rear group G3B having a positive refractive power. When changing focus from that on an object at infinity to that on an object at a proximal distance, the third lens group front group G3A moves from the object side to the image side, while the third lens group rear group G3B is fixed with respect to the image formation plane Sim.

A first lens group G1 is constituted by, in order from the object side to the image side, lenses L11 through L15, and a second lens group G2 is constituted by, in order from the object side to the image side, lenses L21 through L25. The third lens group front group G3A is constituted by a cemented lens formed by cementing a positive lens L31 and a negative lens L32 together, and the third lens group rear group G3B is constituted by, in order from the object side to the image side, lenses L33 and L34. A fourth lens group G4 is constituted by, in order from the object side to the image side, lenses L41 and L42, and a fifth lens group G5 is constituted by, in order from the object side to the image side, lenses L51 through L59.

Basic lens data are shown in Table 3, various items and variable distances are shown in Table 4, and aberration diagrams for a state focused on an object at infinity are illustrated in FIG. 10 for the variable magnification optical system of Example 2.

TABLE 3

Example 2

| Si | Ri | Di | Ndj | vdj |
|---|---|---|---|---|
| 1 | 83.63107 | 2.156 | 1.54224 | 64.67 |
| 2 | 52.93354 | 17.005 | 1.49700 | 81.54 |
| 3 | −758.68040 | 0.100 | | |
| 4 | 83.76092 | 2.000 | 1.83892 | 43.42 |
| 5 | 51.74014 | 11.219 | 1.49700 | 81.54 |
| 6 | 4941.56580 | 2.056 | | |
| 7 | −359.85288 | 2.892 | 1.58913 | 61.13 |
| 8 | 282.28376 | DD [8] | | |
| 9 | −244.28151 | 1.000 | 1.70359 | 56.32 |
| 10 | 53.86953 | 3.091 | | |
| 11 | −105.93134 | 1.000 | 1.71299 | 53.87 |

TABLE 3-continued

Example 2

| Si | Ri | Di | Ndj | vdj |
|---|---|---|---|---|
| 12 | 63.01961 | 1.000 | | |
| 13 | 28.55991 | 4.155 | 1.93584 | 18.30 |
| 14 | 68.64705 | 0.810 | 1.76795 | 51.21 |
| 15 | 27.38442 | 4.593 | | |
| 16 | −72.74801 | 0.800 | 1.70674 | 49.80 |
| 17 | 97.00714 | DD [17] | | |
| 18 | 120.27933 | 4.011 | 1.59349 | 67.00 |
| 19 | −33.13104 | 1.162 | 1.58278 | 59.00 |
| 20 | −55.91667 | 9.215 | | |
| 21 | 57.16094 | 3.653 | 1.71985 | 55.51 |
| 22 | −30.61215 | 0.800 | 1.89828 | 27.70 |
| 23 | −103.79744 | 3.000 | | |
| 24 (St) | ∞ | DD [24] | | |
| 25 | −44.34142 | 0.810 | 1.87236 | 40.76 |
| 26 | 14.53073 | 2.588 | 1.97664 | 26.20 |
| 27 | 43.39989 | DD [27] | | |
| 28 | 23.61535 | 4.623 | 1.49700 | 81.54 |
| 29 | −82.40960 | 0.263 | | |
| 30 | 40.09191 | 1.200 | 1.79333 | 48.67 |
| 31 | 15.95913 | 5.537 | 1.52580 | 63.89 |
| 32 | −34.32984 | 0.193 | | |
| 33 | −29.15246 | 0.800 | 1.79915 | 39.90 |
| 34 | 28.11087 | 2.966 | 1.58257 | 65.15 |
| 35 | −60.94183 | 0.100 | | |
| 36 | 43.75330 | 3.648 | 1.61488 | 56.94 |
| 37 | −26.64577 | 0.800 | 1.77990 | 50.01 |
| 38 | −101.92430 | 10.000 | | |
| 39 | −61.37342 | 0.800 | 1.78654 | 49.35 |
| 40 | 9.27079 | 3.291 | 1.72979 | 29.84 |
| 41 | 6403.39586 | 5.000 | | |
| 42 | ∞ | 4.000 | 1.51633 | 64.14 |
| 43 | ∞ | 11.988 | | |

TABLE 4

Example 2

| | Wide Angle | Intermediate | Telephoto |
|---|---|---|---|
| Zr | 1.0 | 5.0 | 36.3 |
| F | 13.243 | 66.182 | 479.080 |
| F No. | 2.53 | 4.11 | 7.07 |
| 2ω (°) | 50.0 | 9.8 | 1.4 |
| DD [8] | 3.615 | 51.808 | 85.808 |
| DD [17] | 83.814 | 35.621 | 1.621 |
| DD [24] | 3.000 | 21.175 | 47.332 |
| DD [27] | 46.885 | 28.710 | 2.553 |

Example 3

Figure 3:
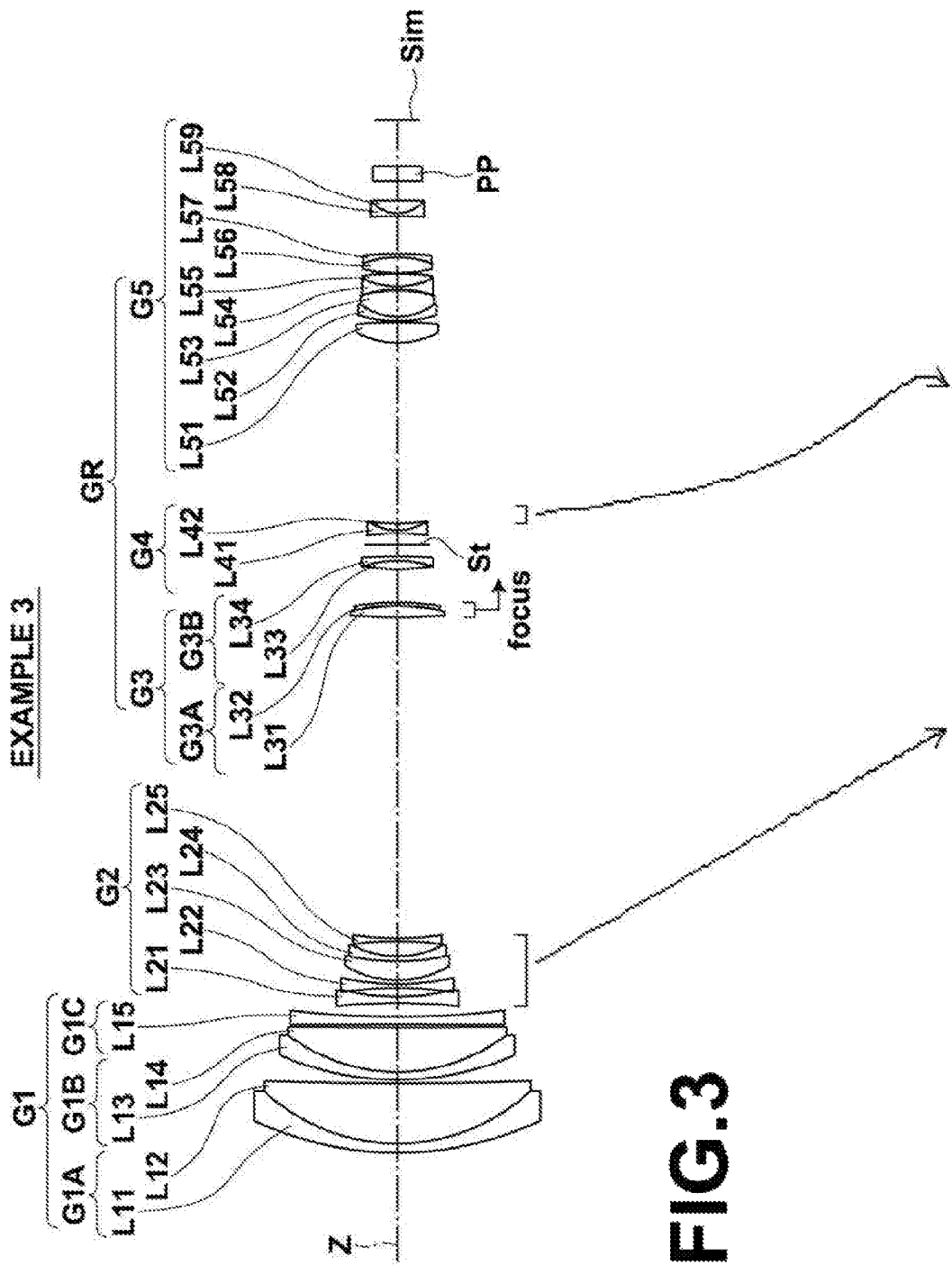
FIG. 3 is a sectional diagram that illustrates the configuration of a variable magnification optical system according to Example 3 of the present disclosure.

The lens configuration of the variable magnification optical system according to Example 3 is illustrated in FIG. 3. The configuration of lens groups, the lens groups that move when changing magnification, and the directions of movement thereof in the variable magnification optical system of Example 3 are the same as those of the variable magnification optical system of Example 1.

Only a portion of a third lens group G3 moves during focusing operations. In the variable magnification optical system of Example 3, the third lens group G3 is constituted by, in order from the object side to the image side, a third lens group front group G3A having a positive refractive power, and a third lens group rear group G3B having a positive refractive power. When changing focus from that on an object at infinity to that on an object at a proximal distance, the third lens group front group G3A moves from the object side to the image side, while the third lens group rear group G3B is fixed with respect to the image formation plane Sim.

A first lens group G1 is constituted by, in order from the object side to the image side, lenses L11 through L15, and a second lens group G2 is constituted by, in order from the object side to the image side, lenses L21 through L25. The third lens group front group G3A is constituted by a positive lens L31 which is a single lens and a negative lens L32 which is a single lens, and the third lens group rear group G3B is constituted by, in order from the object side to the image side, lenses L33 and L34. A fourth lens group G4 is constituted by, in order from the object side to the image side, lenses L41 and L42, and a fifth lens group G5 is constituted by, in order from the object side to the image side, lenses L51 through L59.

Basic lens data are shown in Table 5, various items and variable distances are shown in Table 6, and aberration diagrams for a state focused on an object at infinity are illustrated in FIG. 11 for the variable magnification optical system of Example 3.

TABLE 5

Example 3

| Si | Ri | Di | Ndj | vdj |
|---|---|---|---|---|
| 1 | 90.87887 | 2.418 | 1.50001 | 73.91 |
| 2 | 52.93674 | 15.832 | 1.49700 | 81.54 |
| 3 | 1078.00597 | 0.954 | | |
| 4 | 79.44116 | 2.014 | 1.83714 | 39.36 |
| 5 | 48.49353 | 11.785 | 1.49700 | 81.54 |
| 6 | 6074.67193 | 0.758 | | |
| 7 | −5801.13160 | 2.000 | 1.49700 | 81.54 |
| 8 | 242.11765 | DD [8] | | |
| 9 | −171.05762 | 1.691 | 1.73004 | 55.00 |
| 10 | 62.64558 | 2.341 | | |
| 11 | −94.51213 | 1.000 | 1.71299 | 53.87 |
| 12 | 72.01444 | 1.000 | | |
| 13 | 27.44271 | 5.039 | 1.95001 | 18.37 |
| 14 | 64.88904 | 1.241 | 1.79019 | 41.51 |
| 15 | 25.99552 | 3.998 | | |
| 16 | −86.19512 | 0.800 | 1.70936 | 55.60 |
| 17 | 81.96521 | DD [17] | | |
| 18 | 167.01058 | 2.982 | 1.80001 | 48.00 |
| 19 | −52.94757 | 0.100 | | |
| 20 | −52.94757 | 0.823 | 1.79719 | 41.34 |
| 21 | −72.93886 | 8.838 | | |
| 22 | 61.83946 | 2.010 | 1.71770 | 55.62 |
| 23 | −32.38593 | 1.356 | 1.89498 | 23.97 |
| 24 | −102.93667 | 3.000 | | |
| 25 (St) | ∞ | DD [25] | | |
| 26 | −50.18296 | 0.810 | 1.87658 | 40.15 |
| 27 | 15.09080 | 1.655 | 2.00001 | 25.62 |
| 28 | 40.29609 | DD [28] | | |
| 29 | 23.63938 | 5.380 | 1.49700 | 81.54 |
| 30 | −110.61381 | 0.270 | | |
| 31 | 34.41765 | 1.215 | 1.79529 | 48.23 |
| 32 | 16.48881 | 6.877 | 1.51387 | 71.96 |
| 33 | −33.44173 | 0.284 | | |
| 34 | −29.37505 | 0.800 | 1.79653 | 47.52 |
| 35 | 22.49067 | 3.393 | 1.53837 | 74.10 |
| 36 | −74.14385 | 0.100 | | |
| 37 | 41.49434 | 4.178 | 1.62020 | 60.65 |
| 38 | −26.18224 | 0.800 | 1.79731 | 48.27 |
| 39 | −102.43969 | 10.000 | | |
| 40 | −140.73949 | 0.800 | 1.79918 | 48.08 |
| 41 | 9.65709 | 3.332 | 1.72260 | 28.87 |
| 42 | 897.46882 | 5.000 | | |
| 43 | ∞ | 4.000 | 1.51633 | 64.14 |
| 44 | ∞ | 12.130 | | |

TABLE 6

Example 3

|  | Wide Angle | Intermediate | Telephoto |
|---|---|---|---|
| Zr | 1.0 | 5.0 | 36.3 |
| F | 13.160 | 65.756 | 476.753 |
| F No. | 2.45 | 4.08 | 7.13 |
| 2ω (°) | 52.0 | 10.0 | 1.4 |
| DD [8] | 3.587 | 51.335 | 85.677 |
| DD [17] | 84.552 | 36.804 | 2.462 |
| DD [25] | 3.000 | 21.715 | 48.091 |
| DD [28] | 47.758 | 29.043 | 2.667 |

Example 4

Figure 4:
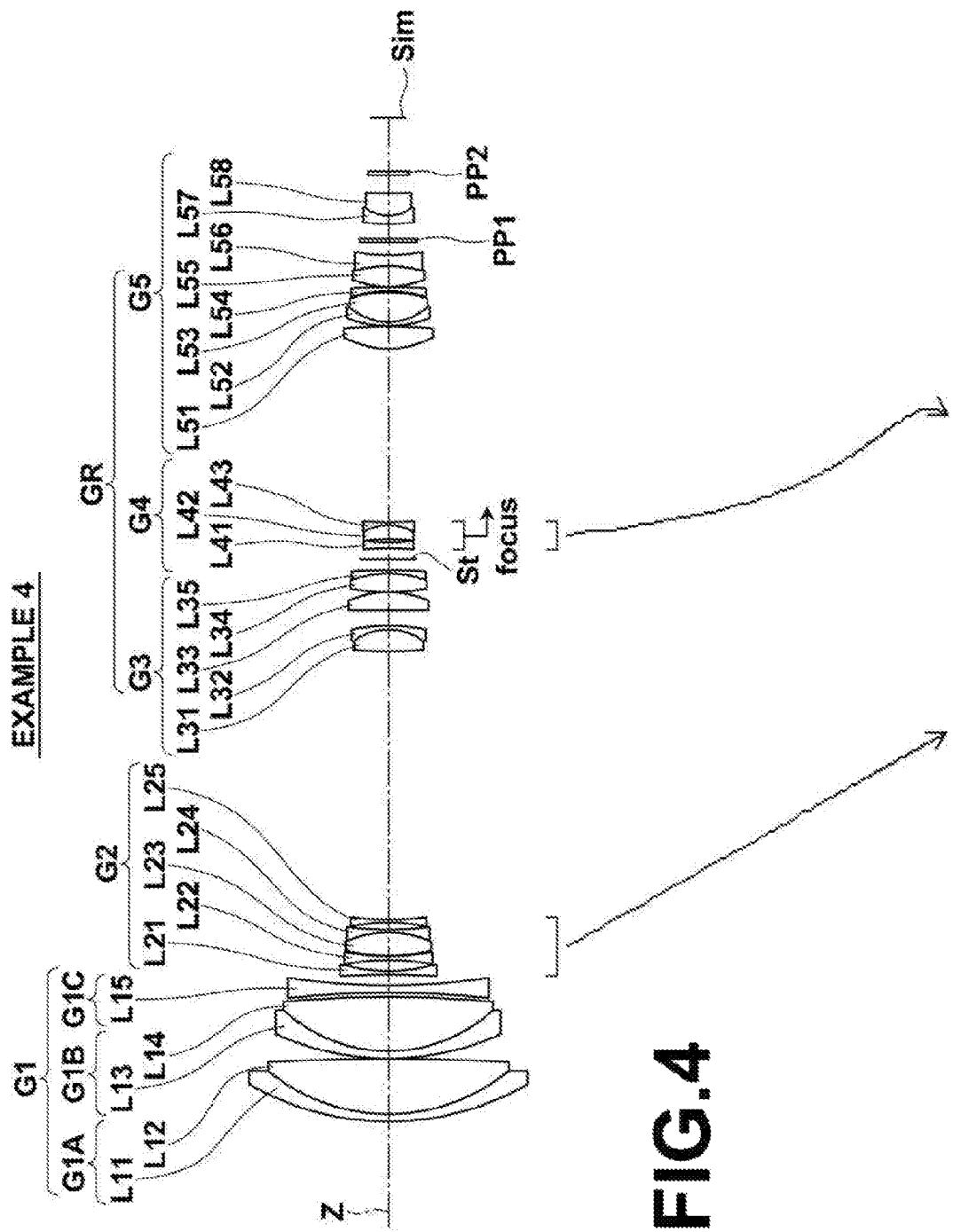
FIG. 4 is a sectional diagram that illustrates the configuration of a variable magnification optical system according to Example 4 of the present disclosure.

The lens configuration of the variable magnification optical system according to Example 4 is illustrated in FIG. 4. The configuration of lens groups, the lens groups that move when changing magnification, and the directions of movement thereof in the variable magnification optical system of Example 4 are the same as those of the variable magnification optical system of Example 1.

Only a fourth lens group G4 moves during focusing operations. When changing focus from that on an object at infinity to that on an object at a proximal distance, the fourth lens group G4 moves from the object side to the image side. The variable magnification optical system of Example 4 is configured such that the transverse magnification ratio of the fourth lens group G4 in a state focused on an object at infinity is negative throughout the entire variable magnification range.

A first lens group G1 is constituted by, in order from the object side to the image side, lenses L11 through L15, a second lens group G2 is constituted by, in order from the object side to the image side, lenses L21 through L25, and a third lens group G3 is constituted by, in order from the object side to the image side, lenses L31 through L35. The fourth lens group G4 is constituted by, in order from the object side to the image side, a negative lens L41, which is a single lens, and a cemented lens formed by cementing a positive lens L42 and a negative lens L43 together. A fifth lens group G5 is constituted by, in order from the object side to the image side, lenses L51 through L58. Note that in the example illustrated in FIG. 4, plane parallel plate shaped optical members PP1 and PP2 are respectively provided between the lens L56 and the lens L57, and between the fifth lens group G5 and an image formation plane Sim. The optical members PP1 and PP2 are similar to the optical member PP illustrated in FIG. 1, and are not essential components of the present disclosure. The optical member PP1 may be a wavelength switching filter to be employed when switching wavelengths to be utilized from the visible range to the infrared range, for example.

Basic lens data are shown in Table 7, various items and variable distances are shown in Table 8, and aberration diagrams for a state focused on an object at infinity are illustrated in FIG. 12 for the variable magnification optical system of Example 4.

TABLE 7

Example 4

| Si | Ri | Di | Ndj | vdj |
|---|---|---|---|---|
| 1 | 77.54033 | 2.010 | 1.58821 | 60.73 |
| 2 | 52.42394 | 14.955 | 1.49700 | 81.54 |
| 3 | −633.69949 | 0.100 | | |
| 4 | 75.38537 | 2.000 | 1.70001 | 49.65 |
| 5 | 42.79620 | 14.692 | 1.49700 | 81.54 |
| 6 | −314.78656 | 1.082 | | |
| 7 | −268.03251 | 2.000 | 1.68652 | 57.17 |
| 8 | 184.93173 | DD [8] | | |
| 9 | −235.72782 | 1.000 | 1.79999 | 48.00 |
| 10 | 45.45757 | 2.943 | | |
| 11 | −64.70170 | 1.000 | 1.80001 | 48.00 |
| 12 | 61.71493 | 0.200 | | |
| 13 | 44.96674 | 6.265 | 1.77505 | 26.25 |
| 14 | −29.26227 | 0.810 | 1.54582 | 65.94 |
| 15 | 80.30118 | 1.931 | | |
| 16 | −50.61195 | 0.811 | 1.80000 | 48.00 |
| 17 | 94.36966 | DD [17] | | |
| 18 | 135.76183 | 5.903 | 1.56769 | 55.95 |
| 19 | −16.01208 | 1.000 | 1.90001 | 36.00 |
| 20 | −52.86444 | 4.295 | | |
| 21 | 1075.10458 | 4.798 | 1.68378 | 44.48 |
| 22 | −27.45210 | 0.100 | | |
| 23 | 61.06515 | 5.032 | 1.60626 | 63.65 |
| 24 | −28.12944 | 0.800 | 1.90001 | 36.32 |
| 25 | −184.18910 | 3.000 | | |
| 26 (St) | ∞ | DD [26] | | |
| 27 | −66.44183 | 1.624 | 1.90000 | 35.14 |
| 28 | 56.87833 | 0.829 | | |
| 29 | −53.61995 | 3.771 | 1.78799 | 25.60 |
| 30 | −13.96524 | 0.810 | 1.68592 | 57.20 |
| 31 | 115.84133 | DD [31] | | |
| 32 | 25.74427 | 6.070 | 1.49700 | 81.54 |
| 33 | −127.27458 | 0.100 | | |
| 34 | 32.48971 | 1.000 | 1.80001 | 46.82 |
| 35 | 15.84736 | 8.071 | 1.49700 | 81.54 |
| 36 | −34.20556 | 0.443 | | |
| 37 | −29.31621 | 0.946 | 1.75908 | 52.09 |
| 38 | −166.97844 | 0.110 | | |
| 39 | 26.21151 | 5.603 | 1.47999 | 58.75 |
| 40 | −37.26666 | 2.922 | 1.47999 | 58.75 |
| 41 | 44.46866 | 3.500 | | |
| 42 | ∞ | 1.000 | 1.51633 | 64.14 |
| 43 | ∞ | 3.975 | | |
| 44 | 52.16868 | 2.213 | 1.74368 | 53.63 |
| 45 | 10.02508 | 6.010 | 1.47999 | 58.75 |
| 46 | 99.99640 | 5.000 | | |
| 47 | ∞ | 1.000 | 1.51633 | 64.14 |
| 48 | ∞ | 14.467 | | |

TABLE 8

Example 4

|  | Wide Angle | Intermediate | Telephoto |
|---|---|---|---|
| Zr | 1.0 | 3.8 | 36.3 |
| F | 11.737 | 45.089 | 424.836 |
| F No. | 2.61 | 3.61 | 6.54 |
| 2ω (°) | 44.8 | 11.6 | 1.2 |
| DD [8] | 2.894 | 37.512 | 74.131 |
| DD [17] | 72.650 | 38.032 | 1.413 |
| DD [26] | 3.000 | 15.943 | 35.480 |
| DD [31] | 47.052 | 34.109 | 14.572 |

Example 5

Figure 5:
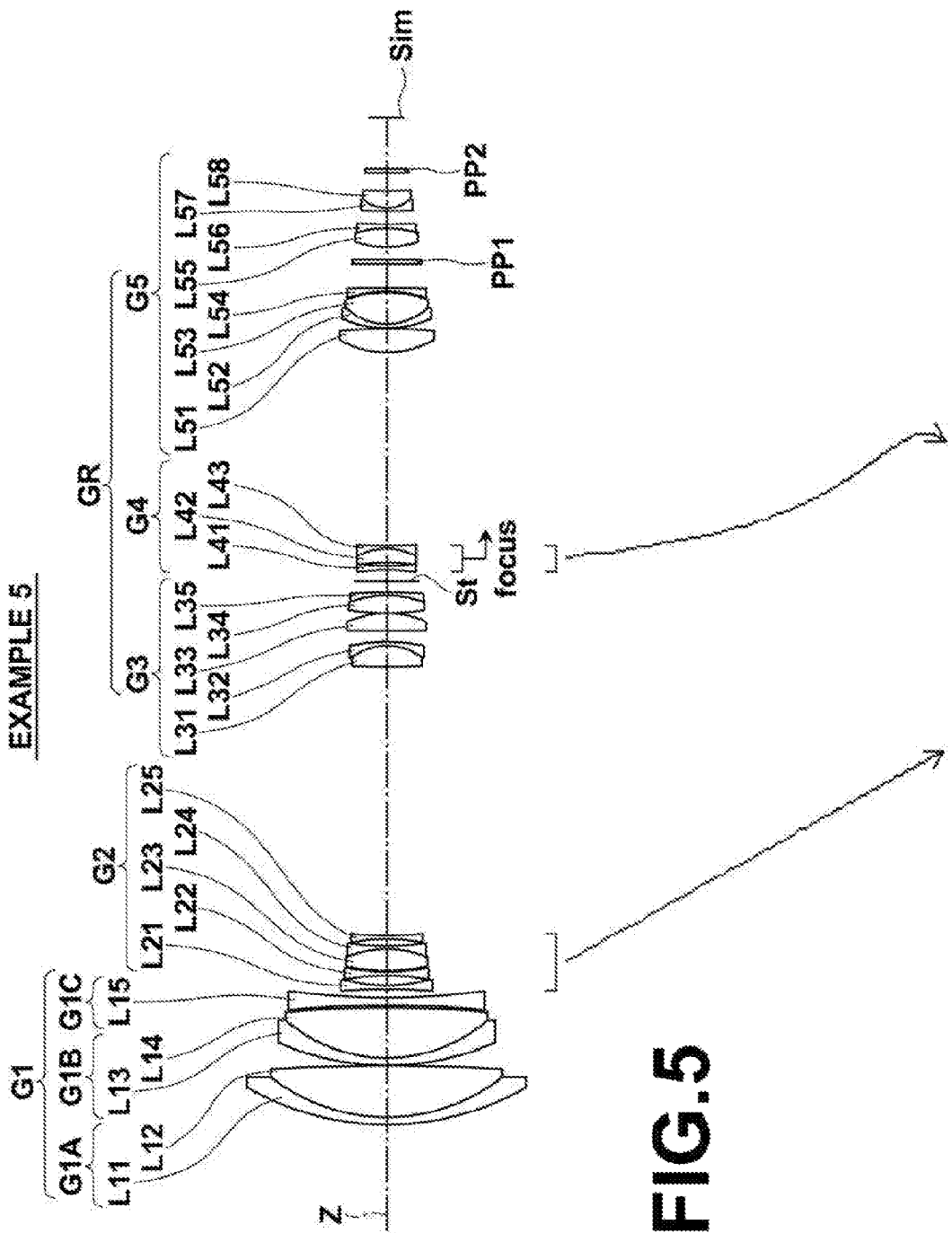
FIG. 5 is a sectional diagram that illustrates the configuration of a variable magnification optical system according to Example 5 of the present disclosure.

The lens configuration of the variable magnification optical system according to Example 5 is illustrated in FIG. 5. The configuration of lens groups, the lens groups that move when changing magnification, and the directions of movement thereof in the variable magnification optical system of Example 5 are the same as those of the variable magnification optical system of Example 1.

Only a fourth lens group G4 moves during focusing operations. When changing focus from that on an object at infinity to that on an object at a proximal distance, the fourth lens group G4 moves from the object side to the image side. The variable magnification optical system of Example 5 is configured such that the transverse magnification ratio of the fourth lens group G4 in a state focused on an object at infinity is negative throughout the entire variable magnification range.

A first lens group G1 is constituted by, in order from the object side to the image side, lenses L11 through L15, a second lens group G2 is constituted by, in order from the object side to the image side, lenses L21 through L25, and a third lens group G3 is constituted by, in order from the object side to the image side, lenses L31 through L35. The fourth lens group G4 is constituted by, in order from the object side to the image side, a negative lens L41, which is a single lens, and a cemented lens formed by cementing a positive lens L42 and a negative lens L43 together. A fifth lens group G5 is constituted by, in order from the object side to the image side, lenses L51 through L58. Note that in the example illustrated in FIG. 5, plane parallel plate shaped optical members PP1 and PP2 are respectively provided between the lens L54 and the lens L55, and between the fifth lens group G5 and an image formation plane Sim. The optical members PP1 and PP2 are similar to the optical members PP1 and PP2 illustrated in FIG. 4, and are not essential components of the present disclosure.

Basic lens data are shown in Table 9, various items and variable distances are shown in Table 10, and aberration diagrams for a state focused on an object at infinity are illustrated in FIG. 13 for the variable magnification optical system of Example 5.

TABLE 9

Example 5

| Si | Ri | Di | Ndj | vdj |
|---|---|---|---|---|
| 1 | 77.80900 | 2.010 | 1.58339 | 61.51 |
| 2 | 51.97341 | 13.902 | 1.49700 | 81.54 |
| 3 | −562.95420 | 0.100 | | |
| 4 | 74.85762 | 2.000 | 1.69209 | 48.97 |
| 5 | 42.66922 | 13.628 | 1.49700 | 81.54 |
| 6 | −299.05772 | 0.691 | | |
| 7 | −263.66968 | 2.000 | 1.69784 | 55.86 |
| 8 | 204.66438 | DD [8] | | |
| 9 | −204.46844 | 1.000 | 1.80001 | 48.00 |
| 10 | 43.11333 | 2.722 | | |
| 11 | −59.60573 | 1.000 | 1.80000 | 48.00 |
| 12 | 60.88263 | 0.200 | | |
| 13 | 44.58596 | 5.972 | 1.78938 | 25.53 |
| 14 | −28.59457 | 0.810 | 1.53195 | 59.42 |
| 15 | 69.25686 | 1.920 | | |
| 16 | −48.65029 | 0.908 | 1.80000 | 46.48 |
| 17 | 95.65677 | DD [17] | | |
| 18 | 257.81491 | 5.751 | 1.56268 | 56.80 |
| 19 | −15.77386 | 1.000 | 1.89999 | 36.99 |
| 20 | −52.63438 | 3.032 | | |
| 21 | 1394.13910 | 4.689 | 1.68210 | 46.45 |
| 22 | −26.77273 | 0.100 | | |
| 23 | 66.14982 | 4.787 | 1.61626 | 62.11 |
| 24 | −28.38781 | 0.800 | 1.89999 | 37.50 |
| 25 | −160.89785 | 3.000 | | |
| 26 (St) | ∞ | DD [26] | | |
| 27 | −59.53123 | 1.159 | 1.82978 | 39.71 |
| 28 | 64.65986 | 0.882 | | |
| 29 | −56.65936 | 3.767 | 1.80249 | 26.43 |
| 30 | −16.80782 | 0.810 | 1.66429 | 58.29 |
| 31 | 191.15137 | DD [31] | | |
| 32 | 25.73095 | 6.432 | 1.49700 | 81.54 |
| 33 | −147.81297 | 0.143 | | |
| 34 | 30.44264 | 1.108 | 1.79036 | 48.93 |
| 35 | 16.64113 | 8.538 | 1.49700 | 81.54 |
| 36 | −33.63077 | 0.376 | | |

TABLE 9-continued

Example 5

| Si | Ri | Di | Ndj | vdj |
|---|---|---|---|---|
| 37 | −30.15467 | 0.800 | 1.75305 | 47.38 |
| 38 | −791.72538 | 6.609 | | |
| 39 | ∞ | 1.000 | 1.51633 | 64.14 |
| 40 | ∞ | 3.500 | | |
| 41 | 26.37182 | 5.113 | 1.47999 | 58.75 |
| 42 | −27.82235 | 1.125 | 1.70705 | 56.15 |
| 43 | 252.69930 | 3.491 | | |
| 44 | 273.83488 | 0.810 | 1.62359 | 60.99 |
| 45 | 10.06816 | 4.599 | 1.47999 | 58.75 |
| 46 | 100.00089 | 5.000 | | |
| 47 | ∞ | 1.000 | 1.51633 | 64.14 |
| 48 | ∞ | 13.811 | | |

TABLE 10

Example 5

| | Wide Angle | Intermediate | Telephoto |
|---|---|---|---|
| Zr | 1.0 | 3.8 | 36.3 |
| F | 11.573 | 44.462 | 418.895 |
| F No. | 2.67 | 3.53 | 6.64 |
| 2ω (°) | 45.6 | 11.8 | 1.2 |
| DD [8] | 2.245 | 37.057 | 73.521 |
| DD [17] | 72.658 | 37.846 | 1.382 |
| DD [26] | 3.000 | 17.419 | 36.356 |
| DD [31] | 52.258 | 37.839 | 18.902 |

Example 6

Figure 6:
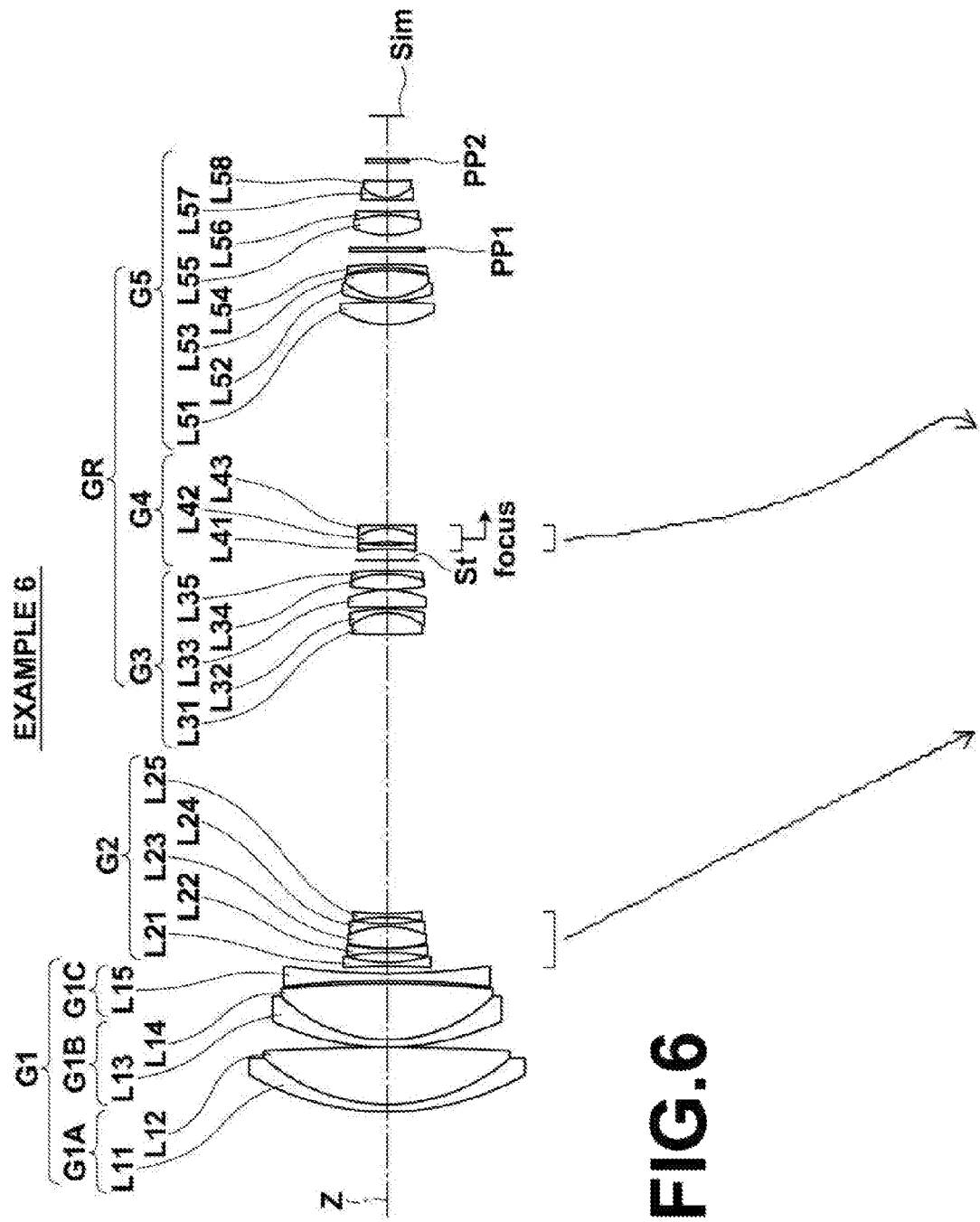
FIG. 6 is a sectional diagram that illustrates the configuration of a variable magnification optical system according to Example 6 of the present disclosure.

The lens configuration of the variable magnification optical system according to Example 6 is illustrated in FIG. 6. The configuration of lens groups, the lens groups that move when changing magnification, and the directions of movement thereof in the variable magnification optical system of Example 6 are the same as those of the variable magnification optical system of Example 1.

Only a fourth lens group G4 moves during focusing operations. When changing focus from that on an object at infinity to that on an object at a proximal distance, the fourth lens group G4 moves from the object side to the image side. The variable magnification optical system of Example 6 is configured such that the transverse magnification ratio of the fourth lens group G4 in a state focused on an object at infinity is negative throughout the entire variable magnification range.

A first lens group G1 is constituted by, in order from the object side to the image side, lenses L11 through L15, a second lens group G2 is constituted by, in order from the object side to the image side, lenses L21 through L25, and a third lens group G3 is constituted by, in order from the object side to the image side, lenses L31 through L35. The fourth lens group G4 is constituted by, in order from the object side to the image side, a negative lens L41, which is a single lens, and a cemented lens formed by cementing a positive lens L42 and a negative lens L43 together. A fifth lens group G5 is constituted by, in order from the object side to the image side, lenses L51 through L58. Note that in the example illustrated in FIG. 6, plane parallel plate shaped optical members PP1 and PP2 are respectively provided between the lens L54 and the lens L55, and between the fifth lens group G5 and an image formation plane Sim. The optical members PP1 and PP2 are similar to the optical members PP1 and PP2 illustrated in FIG. 4, and are not essential components of the present disclosure.

Basic lens data are shown in Table 11, various items and variable distances are shown in Table 12, and aberration diagrams for a state focused on an object at infinity are illustrated in FIG. 14 for the variable magnification optical system of Example 6.

TABLE 11

Example 6

| Si | Ri | Di | Ndj | vdj |
|---|---|---|---|---|
| 1 | 77.46940 | 2.010 | 1.58228 | 61.48 |
| 2 | 52.25773 | 15.600 | 1.49700 | 81.54 |
| 3* | −591.25598 | 0.100 | | |
| 4 | 75.17299 | 2.013 | 1.70002 | 49.85 |
| 5 | 42.39625 | 15.305 | 1.49700 | 81.54 |
| 6 | −314.34196 | 0.774 | | |
| 7 | −263.09520 | 2.000 | 1.69999 | 56.50 |
| 8 | 191.30947 | DD [8] | | |
| 9 | −182.82925 | 1.000 | 1.80001 | 48.00 |
| 10 | 41.39942 | 2.676 | | |
| 11 | −58.30015 | 1.000 | 1.80001 | 48.00 |
| 12 | 60.01798 | 0.200 | | |
| 13 | 43.56186 | 5.917 | 1.78226 | 25.89 |
| 14 | −26.69984 | 0.810 | 1.54603 | 58.18 |
| 15 | 68.47870 | 1.786 | | |
| 16 | −47.83142 | 0.938 | 1.78305 | 49.69 |
| 17 | 93.99119 | DD [17] | | |
| 18 | 296.78033 | 5.923 | 1.56793 | 55.91 |
| 19 | −15.61915 | 1.000 | 1.90000 | 38.00 |
| 20 | −50.82936 | 0.522 | | |
| 21 | 927.95754 | 4.740 | 1.67995 | 49.69 |
| 22 | −26.10032 | 0.100 | | |
| 23 | 64.77623 | 4.246 | 1.61644 | 62.09 |
| 24 | −29.13696 | 0.800 | 1.90001 | 37.87 |
| 25 | −164.42336 | 3.000 | | |
| 26 (St) | ∞ | DD [26] | | |
| 27 | −55.99754 | 1.167 | 1.87426 | 33.39 |
| 28 | 82.82984 | 0.726 | | |
| 29 | −52.34721 | 3.748 | 1.80174 | 24.91 |
| 30 | −16.48287 | 0.810 | 1.67495 | 57.69 |
| 31 | 147639.53693 | DD [31] | | |
| 32 | 25.85714 | 6.168 | 1.49700 | 81.54 |
| 33 | −189.98598 | 0.100 | | |
| 34 | 38.09866 | 1.000 | 1.80001 | 39.67 |
| 35 | 18.28098 | 7.414 | 1.49700 | 81.54 |
| 36 | −57.66796 | 0.895 | | |
| 37 | −35.29051 | 0.878 | 1.59937 | 64.71 |
| 38 | −136.22544 | 3.500 | | |
| 39 | ∞ | 1.000 | 1.51633 | 64.14 |
| 40 | ∞ | 3.500 | | |
| 41 | 22.14900 | 5.552 | 1.48000 | 58.75 |
| 42 | −29.42124 | 0.810 | 1.61822 | 61.81 |
| 43 | 187.64728 | 3.227 | | |
| 44 | 192.60771 | 0.800 | 1.71670 | 55.66 |
| 45 | 9.69194 | 4.467 | 1.47999 | 58.75 |
| 46 | 101.61626 | 5.000 | | |
| 47 | ∞ | 1.000 | 1.51633 | 64.14 |
| 48 | ∞ | 11.838 | | |

TABLE 12

Example 6

| | Wide Angle | Intermediate | Telephoto |
|---|---|---|---|
| Zr | 1.0 | 3.8 | 36.3 |
| F | 11.537 | 44.323 | 417.544 |
| F No. | 2.76 | 3.35 | 6.30 |
| 2ω (°) | 45.0 | 11.6 | 1.2 |
| DD [8] | 2.073 | 40.347 | 77.404 |
| DD [17] | 76.524 | 38.250 | 1.193 |
| DD [26] | 3.000 | 16.130 | 34.132 |
| DD [31] | 55.047 | 41.917 | 23.915 |

Example 7

Figure 7:
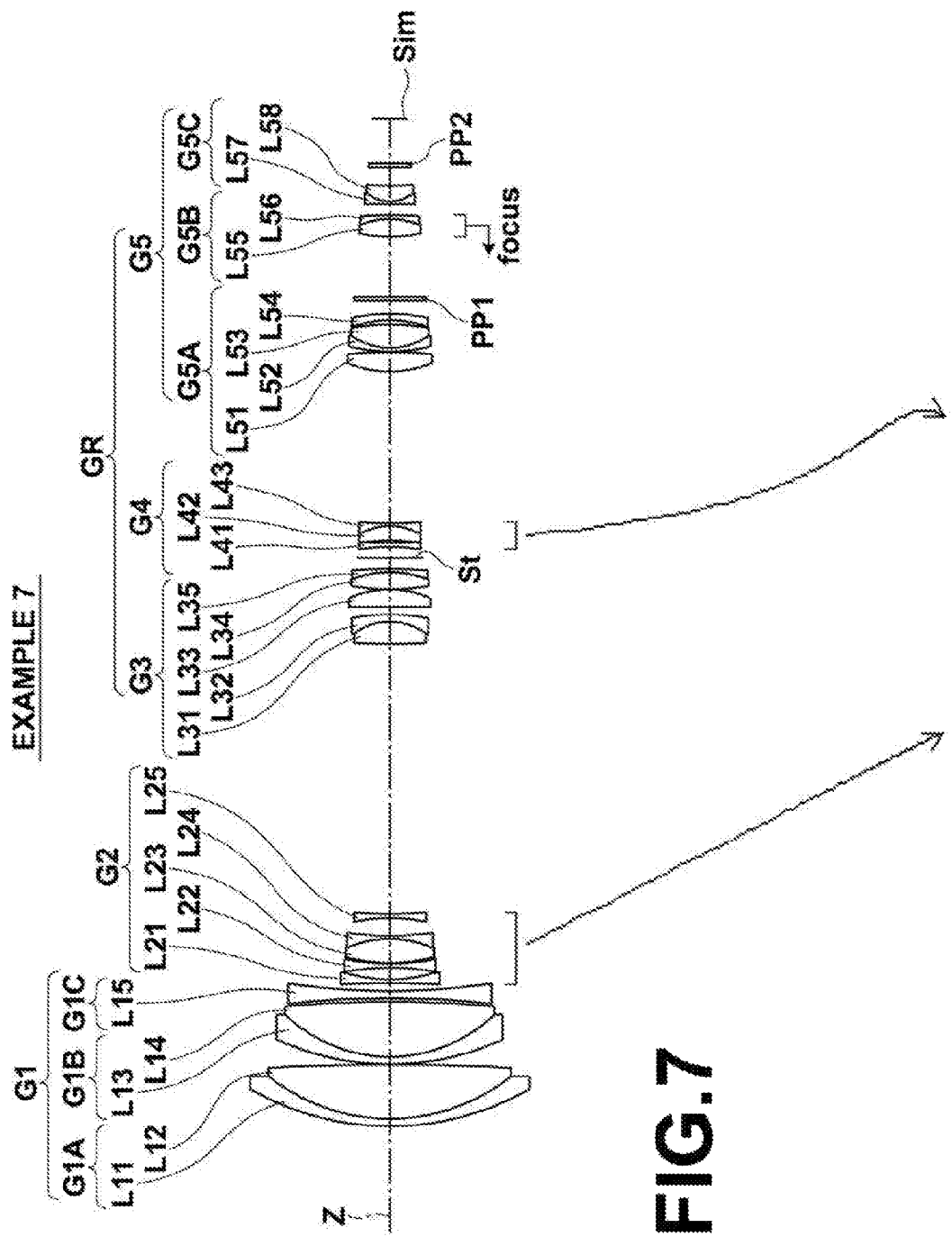
FIG. 7 is a sectional diagram that illustrates the configuration of a variable magnification optical system according to Example 7 of the present disclosure.
Figure 8:
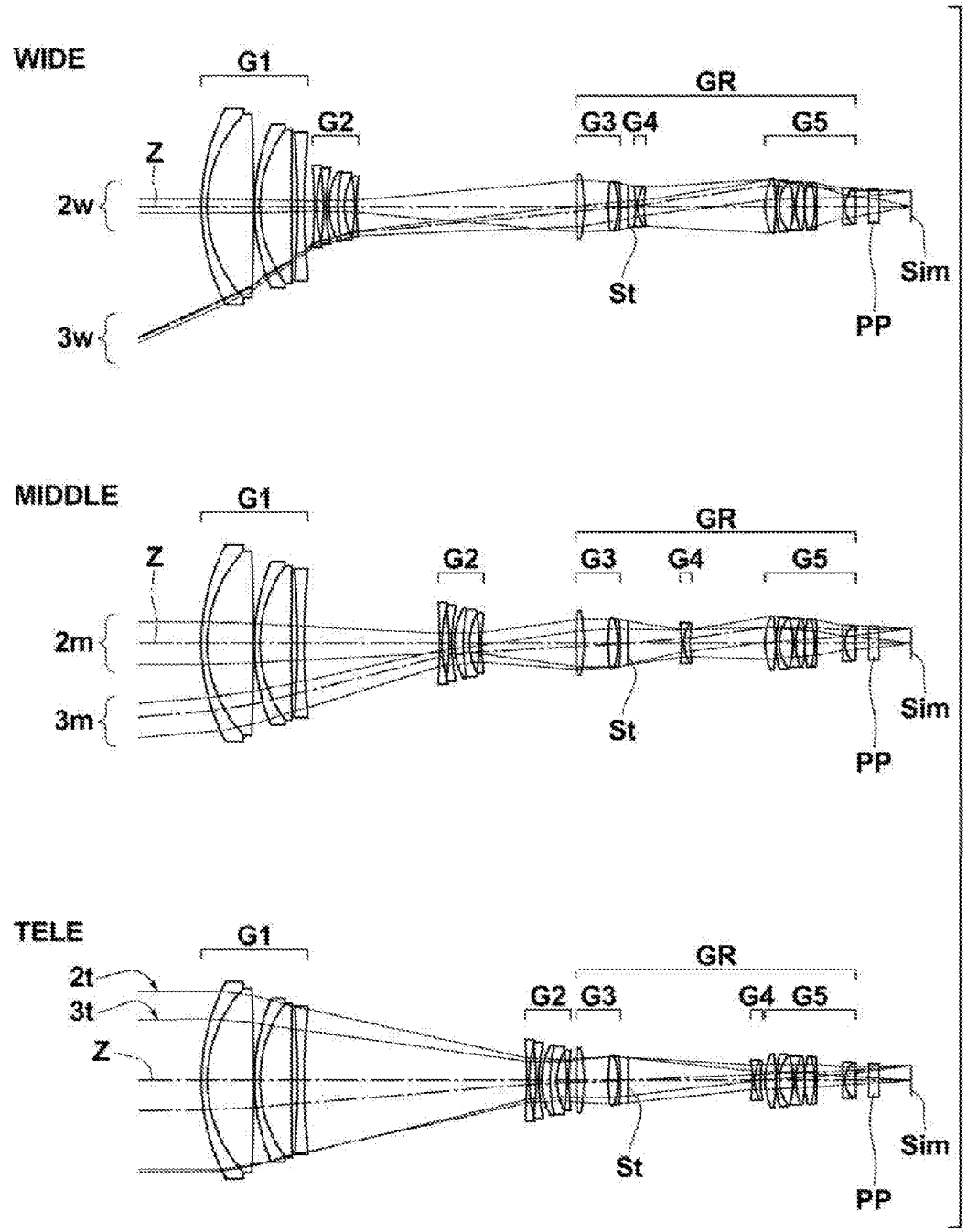
FIG. 8 is a collection of sectional diagrams that illustrate the configuration of the variable magnification optical system of FIG. 1 as well as the paths of light beams that pass therethrough.

The lens configuration of the variable magnification optical system according to Example 7 is illustrated in FIG. 7. The configuration of lens groups, the lens groups that move when changing magnification, and the directions of movement thereof in the variable magnification optical system of Example 7 are the same as those of the variable magnification optical system of Example 1.

Only a portion of a fifth lens group G5 moves during focusing operations. In the variable magnification optical system of Example 7, the fifth lens group G5 is constituted by, in order from the object side to the image side, a fifth lens group front group G5A having a positive refractive power, a fifth lens group middle group G5B having a positive refractive power, and a fifth lens group rear group G5C having a negative refractive power. When changing focus from that on an object at infinity to that on an object at a proximal distance, the fifth lens group middle group G5B moves from the image side to the object side, while the fifth lens group front group G5A and the fifth lens group rear group G5C are fixed with respect to an image formation plane Sim.

A first lens group G1 is constituted by, in order from the object side to the image side, lenses L11 through L15, a second lens group G2 is constituted by, in order from the object side to the image side, lenses L21 through L25, and a third lens group G3 is constituted by, in order from the object side to the image side, lenses L31 through L35. A fourth lens group G4 is constituted by, in order from the object side to the image side, lenses L41 through L43. The fifth lens group front group G5A is constituted by, in order from the object side to the image side, lenses L51 through L54, the fifth lens group middle group G5B is constituted by a cemented lens formed by cementing a positive lens L55 and a negative lens L56, provided in this order from the object side to the image side, together, and the fifth lens group rear group G5C is constituted by, in order from the object side to the image side, lenses L57 and L58.

Basic lens data are shown in Table 13, various items and variable distances are shown in Table 14, and aberration diagrams for a state focused on an object at infinity are illustrated in FIG. 15 for the variable magnification optical system of Example 7.

TABLE 13

Example 7

| Si | Ri | Di | Ndj | vdj |
|---|---|---|---|---|
| 1 | 78.11008 | 2.010 | 1.59655 | 57.09 |
| 2 | 53.97995 | 14.654 | 1.49700 | 81.54 |
| 3 | −616.58085 | 0.100 | | |
| 4 | 75.39809 | 2.000 | 1.69779 | 51.11 |
| 5 | 41.90456 | 14.857 | 1.49700 | 81.54 |
| 6 | −311.92458 | 0.921 | | |
| 7 | −270.28394 | 2.000 | 1.67114 | 57.51 |
| 8 | 189.45833 | DD [8] | | |
| 9 | −217.65944 | 1.000 | 1.80000 | 48.00 |
| 10 | 43.13902 | 3.179 | | |
| 11 | −62.81492 | 1.000 | 1.79206 | 48.79 |
| 12 | 60.90021 | 0.200 | | |
| 13 | 44.33521 | 6.539 | 1.77520 | 26.24 |
| 14 | −29.88246 | 0.810 | 1.54111 | 73.68 |
| 15 | 75.89322 | 4.851 | | |
| 16 | −51.70887 | 1.042 | 1.79999 | 43.05 |
| 17 | 101.85690 | DD [17] | | |
| 18 | 196.07246 | 6.043 | 1.55754 | 57.41 |
| 19 | −16.15615 | 1.885 | 1.90001 | 38.00 |
| 20 | −55.36655 | 1.936 | | |
| 21 | 2609.21875 | 4.802 | 1.68777 | 44.40 |
| 22 | −27.34466 | 0.100 | | |

TABLE 13-continued

Example 7

| Si | Ri | Di | Ndj | νdj |
|---|---|---|---|---|
| 23 | 62.21277 | 4.565 | 1.61130 | 62.88 |
| 24 | −30.11022 | 0.800 | 1.90001 | 35.59 |
| 25 | −172.71494 | 3.000 | | |
| 26 (St) | ∞ | DD [26] | | |
| 27 | −59.71374 | 1.037 | 1.82415 | 39.16 |
| 28 | 69.57930 | 0.753 | | |
| 29 | −57.83851 | 3.887 | 1.79935 | 26.41 |
| 30 | −16.92819 | 0.810 | 1.66140 | 58.43 |
| 31 | 124.86518 | DD[31] | | |
| 32 | 28.86728 | 5.403 | 1.49700 | 81.54 |
| 33 | −104.14424 | 0.100 | | |
| 34 | 45.66787 | 1.000 | 1.80001 | 46.53 |
| 35 | 18.42902 | 6.235 | 1.49700 | 81.54 |
| 36 | −73.62972 | 1.205 | | |
| 37 | −31.37855 | 1.819 | 1.70672 | 44.51 |
| 38 | −46.75502 | 3.500 | | |
| 39 | ∞ | 1.000 | 1.51633 | 64.14 |
| 40 | ∞ | 16.269 | | |
| 41 | 38.44402 | 4.749 | 1.59675 | 58.49 |
| 42 | −21.96704 | 1.020 | 1.65078 | 34.20 |
| 43 | −116.24212 | 3.009 | | |
| 44 | −270.10686 | 0.800 | 1.70093 | 56.45 |
| 45 | 10.44674 | 4.226 | 1.57143 | 41.61 |
| 46 | 99.99640 | 5.000 | | |
| 47 | ∞ | 1.000 | 1.51633 | 64.14 |
| 48 | ∞ | 12.059 | | |

TABLE 14

Example 7

| | Wide Angle | Intermediate | Telephoto |
|---|---|---|---|
| Zr | 1.0 | 3.8 | 36.3 |
| F | 11.545 | 44.353 | 417.873 |
| F No. | 2.60 | 3.41 | 7.03 |
| 2ω (°) | 45.2 | 11.8 | 1.2 |
| DD [8] | 2.133 | 37.770 | 72.517 |
| DD [17] | 73.033 | 37.396 | 2.649 |
| DD [26] | 3.000 | 16.918 | 42.415 |
| DD [31] | 40.866 | 26.948 | 1.451 |

Table 15 shows values corresponding to Conditional Formulae (1) through (8) for Examples 1 through 7. In addition, Table 15 also shows the transverse magnification ratio β4W of the fourth lens group G4 in a state focused on an object at infinity at the wide angle end and the transverse magnification ratio β4T of the fourth lens group G4 in a state focused on an object at infinity at the telephoto end. The values shown in Table 15 are related to the d line.

TABLE 15

| Formula | | Example 1 | Example 2 | Example 3 | Example 4 | Example 5 | Example 6 | Example 7 |
|---|---|---|---|---|---|---|---|---|
| (1) | fT/f2 | −26.556 | −25.823 | −25.089 | −25.076 | −25.904 | −26.712 | −25.984 |
| (2) | fT/f1 | 3.089 | 3.070 | 3.127 | 3.080 | 3.200 | 3.043 | 3.068 |
| (3) | f1/f1C | −0.593 | −0.582 | −0.326 | −0.867 | −0.794 | −0.869 | −0.822 |
| (4) | (L1Cf + L1Cr)/(L1Cf − L1Cr) | 0.132 | 0.121 | 0.920 | 0.183 | 0.126 | 0.158 | 0.176 |
| (5) | νAp − νAn | 17.44 | 16.87 | 7.64 | 20.82 | 20.04 | 20.06 | 24.46 |
| (6) | (νAp + νAn)/2 | 72.83 | 73.11 | 77.73 | 71.14 | 71.52 | 71.51 | 69.32 |
| (7) | β5T | −0.262 | −0.270 | −0.287 | −0.509 | −0.411 | −0.241 | −0.416 |
| (8) | β4T/β4W | 1.391 | 1.415 | 1.431 | 1.733 | 1.513 | 1.237 | 1.615 |
| | β4W | −4.081 | −3.857 | −3.544 | −1.915 | −2.346 | −4.420 | −2.353 |
| | β4T | −5.675 | −5.459 | −5.073 | −3.319 | −3.549 | −5.466 | −3.800 |

As can be understood from the above data, the variable magnification optical systems of Examples 1 through 7 have high variable magnification ratios of 36.6×, favorably correct various aberrations, and realize high optical performance. In addition, the variable magnification optical systems of Examples 1 through 7 have long focal lengths of 400 or greater at the telephoto end and small full angles of view of 1.4° or less at the telephoto end, and are favorably suited as variable magnification optical systems of the telephoto type. Note that in the case that the optical systems disclosed in Japanese Unexamined Patent Publication Nos. H9(1997)-325269 and H4(1992)-191811 are employed as comparative examples and the focal lengths of the optical systems disclosed in Japanese Unexamined Patent Publication Nos. H9(1997)-325269 and H4(1992)-191811 are increased by scaling, it is considered that the correction of spherical aberration and longitudinal chromatic aberration at the telephoto end will become insufficient, and that it would be difficult to realize variable magnification optical systems of the telephoto type having high optical performance.

Figure 16:
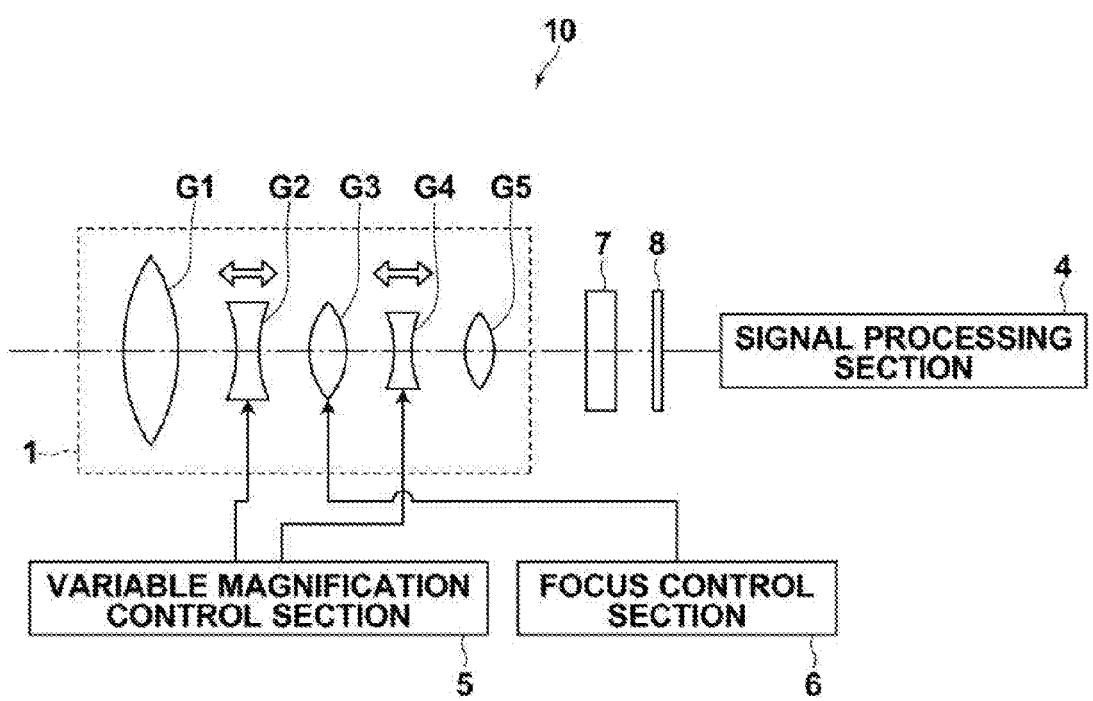
FIG. 16 is a diagram that schematically illustrates the configuration of an imaging apparatus according to an embodiment of the present disclosure.

Next, an embodiment of an imaging apparatus of the present disclosure will be described. FIG. 16 is a diagram that schematically illustrates the configuration of an imaging apparatus 10 that employs a variable magnification optical system 1 according to an embodiment of the present disclosure as an example of an imaging apparatus according to an embodiment of the present disclosure. Examples of the imaging apparatus 10 include, for example, a surveillance camera, a video camera, an electronic still camera, etc.

The imaging apparatus 10 is equipped with the variable magnification optical system 1, a filter 7 provided at the image side of the variable magnification optical system 1, an imaging element 8 that captures images of subjects which are formed by the variable magnification optical system, a signal processing section 4 that processes signals output from the imaging element 8, a variable magnification control section 5 for changing the magnification of the variable magnification optical system 1, and a focus control section 6 for performing focusing operations of the variable magnification optical system 1. FIG. 16 illustrates an example in which the variable magnification optical system 1 is constituted by a first lens group G1 through a fifth lens group G5. Each of the lens groups are illustrated conceptually. The imaging element 8 captures images of subjects formed by the variable magnification optical system 1 and converts the captured images into electrical signals. The imaging element 8 is provided such that the image capturing surface thereof matches the image formation plane of the variable magnification optical system 1. A CCD (Charge Coupled Device), a CMOS (Complementary Metal Oxide Semiconductor) or the like may be employed as the imaging element 8. Note that only one imaging element 8 is illustrated in FIG. 16. However, the imaging apparatus of the present disclosure is not limited to such a configuration, and may be an imaging apparatus of the so called three plate format, which has three imaging elements.

The present disclosure has been described with reference to the embodiments and Examples thereof. However, the variable magnification optical system of the present disclosure is not limited to the embodiments and Examples described above, and various modifications are possible. For example, the values of the radii of curvature of each lens, the distances among surfaces, the refractive indices, and the Abbe's numbers may be different values.

What is claimed is:

1. A variable magnification optical system consisting of, in order from the object side to the image side:
    a first lens group having a positive refractive power, which is fixed with respect to an image formation plane when changing magnification;
    a second lens group having a negative refractive power that moves from the object side to the image side when changing magnification from the wide angle end to the telephoto end; and
    a rearward lens group having a positive refractive power throughout the entire variable magnification range that includes at least one lens group that moves when changing magnification, the distance between the rearward lens group and the second lens group changing when changing magnification;
    the first lens group consisting of, in order from the object side to the image side, a first lens group front group having a positive refractive power, a first lens group middle group having a positive refractive power, and a first lens group rear group having a negative refractive power;
    the first lens group front group consisting of a cemented lens formed by cementing a negative lens and a positive lens, provided in this order from the object side to the image side, together, the coupling surface of this cemented lens being convex toward the object side, and the surface most toward the object side within the first lens group front group being convex;
    the first lens group middle group consisting of a cemented lens formed by cementing a negative lens and a positive lens, provided in this order from the object side to the image side, together, the coupling surface of this cemented lens being convex toward the object side, and the surface most toward the object side within the first lens group middle group being convex;
    the first lens group rear group consisting of one negative lens;
    Conditional Formula (1) below being satisfied:

$$-50 < fT/f2 < -10 \tag{1}$$

wherein fT is the focal length of the entire optical system at the telephoto end, and f2 is the focal length of the second lens group; and
    Conditional Formula (2) below being satisfied:

$$2 < fT/f1 < 5 \tag{2}$$

wherein f1 is the focal length of the first lens group.

2. A variable magnification optical system as defined in claim 1, in which Conditional Formula (2-1) below is satisfied:

$$2.5 < fT/f1 < 3.5 \tag{2-1}$$

3. A variable magnification optical system as defined in claim 1, in which Conditional Formula (3) below is satisfied:

$$-1.5 < f1/f1C < -0.3 \tag{3}$$

wherein f1 is the focal length of the first lens group, and f1C is the focal length of the first lens group rear group.

4. A variable magnification optical system as defined in claim 3, in which Conditional Formula (3-1) below is satisfied:

$$-1 < f1/f1C < -0.5 \tag{3-1}$$

5. A variable magnification optical system as defined in claim 1, in which Conditional Formula (4) below is satisfied:

$$0 < (L1Cf + L1Cr)/(L1Cf - L1Cr) < 0.95 \tag{4}$$

wherein L1Cf is the radius of curvature of the surface toward the object side of the negative lens of the first lens group rear group, and L1Cr is the radius of curvature of the surface toward the image side of the negative lens of the first lens group rear group.

6. A variable magnification optical system as defined in claim 5, in which Conditional Formula (4-1) below is satisfied:

$$0.05 < (L1Cf + L1Cr)/(L1Cf - L1Cr) < 0.5 \tag{4-1}$$

7. A variable magnification optical system as defined in claim 1, in which Conditional Formulae (5) and (6) below are satisfied:

$$0 < vAp - vAn < 35 \tag{5}$$

$$60 < (vAp + vAn)/2 < 90 \tag{6}$$

wherein vAp is the Abbe's number with respect to the d line of the positive lens within the first lens group front group, and vAn is the Abbe's number with respect to the d line of the negative lens within the first lens group front group.

8. A variable magnification optical system as defined in claim 7, in which Conditional Formula (5-1) below is satisfied:

$$5 < vAp - vAn < 30 \tag{5-1}$$

9. A variable magnification optical system as defined in claim 7, in which Conditional Formula (6-1) below is satisfied:

$$65 < (vAp + vAn)/2 < 80 \tag{6-1}$$

10. A variable magnification optical system as defined in claim 1, wherein:
    the rearward lens group consists of, in order from the object side to the image side:
    a third lens group having a positive refractive power which is fixed with respect to the image formation plane when changing magnification;
    a fourth lens group having a negative refractive power which moves when changing magnification; and
    a fifth lens group having a positive refractive power, the distance between the fourth lens group and the fifth length group changing when changing magnification.

11. A variable magnification optical system as defined in claim 10, wherein:
    a stop which is fixed with respect to the image formation plane when changing magnification is provided.

12. A variable magnification optical system as defined in claim 10, in which Conditional Formula (7) below is satisfied:

$$-1 < \beta 5T < 0 \tag{7}$$

wherein $\beta 5T$ is the transverse magnification ratio of the fifth lens group in a state focused on an object at infinity at the telephoto end.

13. A variable magnification optical system as defined in claim 12, in which Conditional Formula (7-1) below is satisfied:

$$-0.6 < \beta 5T < -0.2 \tag{7-1}$$

14. A variable magnification optical system as defined in claim 10, in which Conditional Formula (8) below is satisfied:

$$1.15 < \beta 4T/\beta 4W < 3 \tag{8}$$

wherein β4T is the transverse magnification ratio of the fourth lens group in a state focused on an object at infinity at the telephoto end, and β4W is the transverse magnification ratio of the fourth lens group in a state focused on an object at infinity at the wide angle end.

15. A variable magnification optical system as defined in claim 14, in which Conditional Formula (8-1) below is satisfied:

$$1.2 < \beta 4T/\beta 4W < 2 \tag{8-1}$$

16. A variable magnification optical system as defined in claim 10, wherein:
the fifth lens group is fixed with respect to the image formation plane when changing magnification.

17. A variable magnification optical system as defined in claim 1, in which Conditional Formula (1-2) below is satisfied:

$$-40 < fT/f2 < -15 \tag{1-2}$$

18. An imaging apparatus equipped with a variable magnification optical system as defined in claim 1.

* * * * *